US011671383B2

(12) United States Patent
Barua et al.

(10) Patent No.: US 11,671,383 B2
(45) Date of Patent: Jun. 6, 2023

(54) NATURAL LANGUAGE SERVICE INTERACTION THROUGH AN INBOX

(71) Applicant: Microsoft Technology Licensing, LLC, Redmond, WA (US)

(72) Inventors: Chowdhury Barua, Redmond, WA (US); Lei Yu, Redmond, WA (US); Victor Boctor, Redmond, WA (US); Pretish Abraham, Sammamish, WA (US); Raju Nagalinga S, Bangalore KA (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 665 days.

(21) Appl. No.: 15/275,728

(22) Filed: Sep. 26, 2016

(65) Prior Publication Data
US 2018/0089165 A1 Mar. 29, 2018

(51) Int. Cl.
| G06F 15/16 | (2006.01) |
| H04L 51/02 | (2022.01) |
| H04L 51/08 | (2022.01) |
| G06Q 10/107 | (2023.01) |
| G06Q 50/00 | (2012.01) |
| H04L 51/52 | (2022.01) |

(52) U.S. Cl.
CPC .......... H04L 51/02 (2013.01); G06Q 10/107 (2013.01); G06Q 50/01 (2013.01); H04L 51/08 (2013.01); H04L 51/52 (2022.05)

(58) Field of Classification Search
CPC .......... H04L 51/18; H04L 51/22; H04L 51/24
USPC .......................................................... 709/206
See application file for complete search history.

(56) References Cited

U.S. PATENT DOCUMENTS

| 6,671,355 B1 | 12/2003 | Spielman et al. |
| 7,509,304 B1* | 3/2009 | Pather ................ H04L 12/1859 |
| 7,693,940 B2 | 4/2010 | Carmel et al. |
| 7,774,292 B2 | 8/2010 | Brennan et al. |
| 8,032,598 B1 | 10/2011 | He et al. |
| 8,224,906 B2 | 7/2012 | Mikkonen et al. |
| 8,346,563 B1 | 1/2013 | Hjelm et al. |
| 8,719,425 B2 | 5/2014 | Barman et al. |
| 8,843,572 B2 | 9/2014 | Forstall et al. |
| 9,043,407 B1 | 5/2015 | Gaulke et al. |
| 9,219,704 B2 | 12/2015 | Hamlin et al. |
| 9,338,114 B2 | 5/2016 | Affronti et al. |
| 9,350,692 B1 | 5/2016 | van As et al. |
| 9,418,056 B2 | 8/2016 | Greenberg et al. |
| 2002/0133554 A1 | 9/2002 | Checkoway et al. |
| 2004/0141011 A1 | 7/2004 | Smethers et al. |
| 2004/0162879 A1 | 8/2004 | Arcuri et al. |

(Continued)

OTHER PUBLICATIONS

Hotson, Dennis, "Building an Intelligent Bot Using the Slack API", Published on: Sep. 22, 2015 Available at: http://nordicapis.com/building-an-intelligent-bot-using-the-slack-api/.

(Continued)

Primary Examiner — Anh Nguyen
(74) Attorney, Agent, or Firm — Christopher J. Volkmann; Kelly, Holt & Christenson, PLLC

(57) ABSTRACT

A message is received, that represents an action to be performed in a service. The message includes a natural language portion and an endpoint to interact with. The natural language portion is parsed to identify the action and the endpoint is interacted with to perform the action.

19 Claims, 24 Drawing Sheets

(56) References Cited

U.S. PATENT DOCUMENTS

| | | | |
|---|---|---|---|
| 2004/0205772 A1 | 10/2004 | Uszok et al. | |
| 2005/0108332 A1 | 5/2005 | Vaschillo et al. | |
| 2005/0210396 A1 | 9/2005 | Galli | |
| 2006/0015755 A1 | 1/2006 | Jaffe | |
| 2006/0150119 A1 | 7/2006 | Chesnais et al. | |
| 2009/0077069 A1* | 3/2009 | Polanyi | G06F 16/319 |
| 2009/0172109 A1 | 7/2009 | Weir et al. | |
| 2010/0057859 A1 | 3/2010 | Shen et al. | |
| 2010/0086110 A1* | 4/2010 | Boussard | H04L 51/04 |
| | | | 379/88.13 |
| 2010/0167766 A1* | 7/2010 | Duarte | H04L 65/1069 |
| | | | 455/466 |
| 2010/0191818 A1 | 7/2010 | Satterfield et al. | |
| 2010/0211889 A1 | 8/2010 | Durazo et al. | |
| 2011/0289161 A1 | 11/2011 | Rankin et al. | |
| 2012/0088527 A1* | 4/2012 | Roka | H04L 51/16 |
| | | | 455/466 |
| 2012/0110469 A1 | 5/2012 | Magarshak | |
| 2012/0131474 A1* | 5/2012 | Panchadsaram | G06Q 10/107 |
| | | | 715/752 |
| 2013/0097526 A1 | 4/2013 | Stovicek et al. | |
| 2013/0103391 A1* | 4/2013 | Millmore | G06Q 10/06 |
| | | | 704/9 |
| 2013/0159432 A1 | 6/2013 | Deering et al. | |
| 2013/0318582 A1 | 11/2013 | Mccann et al. | |
| 2014/0082521 A1 | 3/2014 | Carolan et al. | |
| 2014/0136609 A1 | 5/2014 | Churchill et al. | |
| 2014/0172986 A1* | 6/2014 | Kumar | G06Q 10/107 |
| | | | 709/206 |
| 2014/0244432 A1 | 8/2014 | Middlebrooks | |
| 2014/0255895 A1 | 9/2014 | Shaffer et al. | |
| 2014/0257852 A1 | 9/2014 | Walker et al. | |
| 2014/0337441 A1* | 11/2014 | Schnitman | H04L 51/18 |
| | | | 709/206 |
| 2015/0032824 A1 | 1/2015 | Kumar et al. | |
| 2015/0033141 A1 | 1/2015 | Mishra | |
| 2015/0067503 A1 | 3/2015 | Slayton et al. | |
| 2015/0081277 A1* | 3/2015 | Behi | G06F 40/205 |
| | | | 704/9 |
| 2015/0082198 A1 | 3/2015 | Destagnol et al. | |
| 2015/0304250 A1* | 10/2015 | Zomet | G06Q 30/0277 |
| | | | 705/14.72 |
| 2016/0173578 A1 | 6/2016 | Sharma et al. | |
| 2016/0231907 A1 | 8/2016 | Sirpal et al. | |
| 2017/0033987 A1 | 2/2017 | Bush et al. | |
| 2017/0223128 A1* | 8/2017 | Shuvaev | H04W 88/06 |
| 2017/0236512 A1* | 8/2017 | Williams | G06F 16/68 |
| | | | 381/79 |
| 2017/0371532 A1* | 12/2017 | Panchapakesan | H04L 51/18 |
| 2018/0091458 A1 | 3/2018 | Goyal et al. | |
| 2018/0091462 A1 | 3/2018 | Yu et al. | |

OTHER PUBLICATIONS

Faisal, Mohiuddin Syed, "Design and Implementation of E-Mail Agent", Retrieved on: Sep. 1, 2016 Available at: https://wwwmatthes.in.tum.de/file/3k6t6mf9rirj/sebis-Public-Website/Publications/2001/Fais01/Fais01.pdf.

"A list of the 51 best plugins and add-ins for Microsoft Outlook", Retrieved From: https://mxhero.com/blog/list-of-51-best -outlook-email-add-ins-plugins-complete-resource-guide, Dec. 30, 2015, 9 Pages.

"Configure mail flow using connectors in Office 365", Retrieved From: https://technet.microsoft.com/en-us/library/ms.exch.eac.connectorselection(v=exchg. 150).aspx, Jun. 20, 2015, 7 Pages.

"Email Notification Threading", Retrieved From: https://forums.adobe.com/thread/600109, Sep. 2, 2016, 3 Pages.

"Group notifications in a single email thread", Retrieved From: http://community.servicenow.com/community?id=community_question&sys_id=305e4feddb9cdbc01dcaf3231f961920, Sep. 2, 2016, 2 Pages.

"Microsoft Outlook Social Connector Provider for Facebook", Retrieved From: https://www.microsoft.com/en-us/download/details.aspx?id=5039, Sep. 2, 2016, 5 Pages.

"Office 365 Connectors API Reference", Retrieved From: http://dev.outlook.com/Connectors/Reference, Sep. 8, 2016, 8 Pages.

"Related e-mail notifications aren't threaded", Retrieved From: http://www.redmine.org/issues/1401, Sep. 2, 2016, 2 Pages.

"Threading email notifications about the same trigger", Retrieved From: http://support.zabbix.com/browse/ZBXNEXT-1899, Sep. 2, 2016, 1 Page.

"Threading Jira notification emails in Outlook 2010", Retrieved From: http://superuser.com/questions/282185/threading-jira-notification-emails-in-outlook-2010, Jun. 24, 2011, 2 Pages.

"Tutorial how to extend social email notifications", Retrieved From: http://www.exoplatform.com/company/en/resource-viewerITutorial/how-to-extend-social-email-notifications, Sep. 2, 2016, 6 Pages.

"Non Final Office Action Issued in U.S. Appl. No. 15/275,712", dated Oct. 25, 2018, 29 Pages.

"Non-Final Office Action Issued in U.S. Appl. No. 15/275,740", dated Jul. 11, 2018, 12 Pages.

Ailon, et al., "Threading machine generated email", In Proceedings of sixth ACM international conference on Web search and data mining, Feb. 4, 2013, pp. 405-415.

David, Pszota, "Email Communication Transformation into Knowledge Base", Retrieved From: http://vi.ikt.ui.sav.sk/@api/deki/files/2516/=DPII_Email_communication_as_knowledge_base_-_final.pdf, Dec. 2012, 44 Pages.

Kyle, Pearce, "15 Free Gmail Plugins That Will Help You Conquer Your Inbox", Retrieved From: https://www.diygenius.com/15-free-gmail-plugins-that-will-improve-your-email-workflow/, May 9, 2014, 10 Pages.

Sohn, et al., "Addressing mobile information overload in the universal inbox through lenses", In Proceedings of the 12th international conference on Human computer interaction with mobile devices and services, Sep. 7, 2010, 4 Pages.

"Non Final Office Action Issued in U.S. Appl. No. 15/275,740", dated Sep. 3, 2019, 14 Pages.

"Non Final Office Action issued in U.S. Appl. No. 15/275,712", dated Aug. 6, 2019, 34 Pages.

"Final Office Action Issued in U.S. Appl. No. 15/275,712", dated Jan. 13, 2020, 47 Pages.

"Final Office Action Issued in U.S. Appl. No. 15/275,712", dated Feb. 21, 2019, 28 Pages.

"Final Office Action Issued in U.S. Appl. No. 15/275,740", dated Feb. 5, 2019, 15 Pages.

* cited by examiner

FIG. 9D

- Search mail and people
- New  Delete  Archive  Junk ∨  Sweep  Move to  Hashtags  undo Folders
- Inbox  47
- Archive
- Junk
- Drafts
- Sent  107
- Deleted Categories
- Family  5
- Newsletters  17
- Shopping  11
- Social Updates  5
- Travel Focused  Other  All ∨

Kelly R.
Download your tickets – Order #1231...  5:17 PM
Here are your tickets for the masters!

Reggie S.
Latest tour boots  2:42 PM
We'll send 'em out around August. They're...

ACME.com
Your order is on its way!  12:05 PM
Hi David.

Yesterday
Javier A.
Japan trip  Mon 4:14 PM
Itinerary: Hakuba, Hokaido, ....

Cliff V.
Contina skis  Mon 3:45 PM
Yo - I'm totally in to be sponsored by the...

☐ Service 3
End of season sale - don't miss out!  12:27 PM
Email Service 3.com/23456789

Kelly R.

End of season sale – don't miss out!

☐ Service 3
Today  5:07 PM

Service 3  MEN'S  WOMEN'S  WEB SPECIALS

Free shipping on orders over $75*

SALE

Service 3

☐ Any down jackets on sale?

NATURAL LANGUAGE SERVICE INTERACTION THROUGH AN INBOX

BACKGROUND

Computing systems are currently in wide use. Some such computing systems run hosted services and allow users to subscribe to those services. For instance, some services can be list management services, social network services, electronic mail services, project management services, or a wide variety of other services.

Some such services allow a user to submit an electronic mail (e-mail) address where the user is to receive various different types of messages from the service. These messages are often generated by the service, and sent to the user's e-mail address at intermittent times. Thus, users can receive generic, undifferentiated e-mails from a variety of different services, that disrupt the user's focus, or that can get lost with other e-mails in the user's electronic mail system.

Similarly, it is common that users have no control over the various messages they receive from a service they subscribe to. Instead, the service, itself, controls what e-mail messages the subscribers receive. This experience can become unmanageable for a user, as services send more messages over time, and as the user subscribes to more services.

In addition, once a user receives an e-mail message from the service, the e-mail message may request that the user perform some action with respect to that service. This commonly means that the user must navigate away from his or her e-mail, such as using a browser, and navigate to the site of the service, and then perform the desired action, using the interface provided by the service.

Further, notifications or other e-mail messages from a service can cause clutter, thus degrading the user experience. This can happen, for instance, when multiple e-mails are sent by the service concerning a particular item. By way of example, an e-mail may be sent when the service developers discover a bug. Another e-mail may be sent indicating that the bug is being addressed and an approximate time when the bug will be fixed. Yet another e-mail may be sent when the bug is fixed. These e-mails may be received by the user's e-mail system in a scattered and relatively ad hoc fashion. This can be exacerbated when the user has subscribed to multiple services, and this can degrade the user experience even further.

The discussion above is merely provided for general background information and is not intended to be used as an aid in determining the scope of the claimed subject matter.

SUMMARY

A message is received, that represents an action to be performed in a service. The message includes a natural language portion and an endpoint to interact with. The natural language portion is parsed to identify the action and the endpoint is interacted with to perform the action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 9A-9E show examples of user interfaces generated during the processing of conversational, natural language inputs.

DETAILED DESCRIPTION

Figure 1:
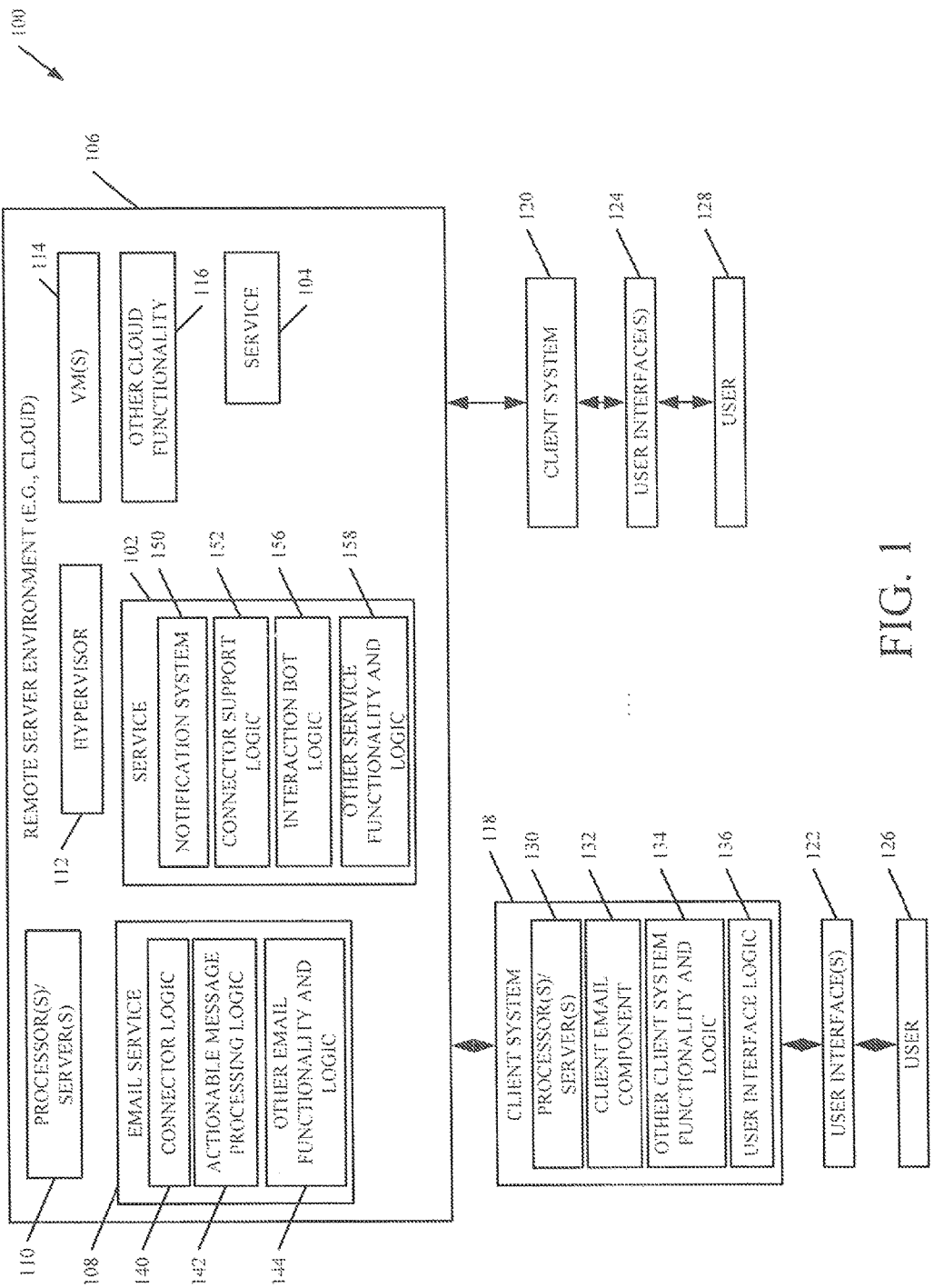
FIG. 1 is a block diagram of one example of a service notification architecture.

FIG. 1 is a block diagram of one example of a service notification architecture 100. Architecture 100 shows a plurality of services 102-104 disposed in a remote server environment 106 (such as a cloud). FIG. 1 also shows that the cloud can have an e-mail service 108, one or more processors or servers 110, hypervisor and virtual machines 112-114, and other cloud functionality 116. Also, FIG. 1 shows that a plurality of client systems 118-120 can interact with the various services in cloud 106. Client systems 118-120 are shown generating user interfaces 122-124 for interaction by users 126-128. Users 126-128 illustratively interact with user interfaces 122-124, respectively, in order to control and manipulate client systems 118-120, and also various services in cloud 106.

Client systems 118-120 can be similar or different client systems. For purposes of the present discussion, it will be assumed that they are similar, so that only client system 118 will be described in more detail. In one example, client system 118 includes one or more processors or servers 130, a client e-mail component 132, other client system functionality and logic 134, and user interface logic 136. Client e-mail component 132 can be a client component of e-mail service 108 that is, itself, hosted in remote server environment 106. User interface logic 136 can generate user interfaces 122 and detect and process user interaction with those interfaces, as well. Other functionality and logic 134 can take a wide variety of different forms and will depend on the particular client system it is deployed in, the particular way that the user is using the client system, and/or on a wide variety of other things.

E-mail service 108 illustratively includes connector logic 140, actionable message processing logic 142, and it can include a wide variety of other e-mail functionality and logic 144. In one example, user 126 can interact directly with email service 108. In another example, client email component 132 is used. In the latter example, e-mail service 108 illustratively interacts with client e-mail component 132 to allow user 126 to perform a variety of different e-mail operations. Such operations can include configuring the user's e-mail system with various folders, filters, etc. It can also allow the user to author and send electronic mail messages, receive electronic mail messages, attach attachments to messages, and a wide variety of other things. Connector logic 140 illustratively allows the user to integrate his or her e-mail service with other services 102-104, that the user uses. Specifically, it allows the user to identify which particular notifications from which particular services that the user wishes to receive as email messages within the user's inbox. This is described in greater detail below.

Actionable message processing logic 142 can be a part of connector logic 140 or separate from it. It is shown as being separate from it in FIG. 1 for the sake of example only. Actionable message processing logic 142 illustratively allows user 126 to generate, or interact with, an actionable message within the user's e-mail system. Logic 142 will interact with a particular service 102-104 that the action is directed to, to perform an action indicated by the actionable message. This is also described in greater detail below.

Services 102-104 can also have similar or different components. In addition, they can have some components that are similar and some that are different. For the purposes of the present description, services 102-104 will operate in a similar way with respect to connector logic 140 and actionable message processing logic 142. Therefore, for the sake of the present example, only service 102 will be described in more detail.

In the example shown in FIG. 1, service 102 illustratively includes notification system 150, connector support logic 152, interaction bot logic 156, and it can include a wide variety of other service functionality and logic 158. Notification system 150 illustratively generates notifications for service 102. The particular notifications that are generated will vary widely, depending upon the type of service 102, the type of notifications that service 102 wishes to surface for the user, and a wide variety of other things.

Connector support logic 152 illustratively interacts with connector logic 150 in e-mail service 108 in order to integrate service 102 into e-mail service 108. For purposes of the present discussion, connector support logic 152 allows user 126, through connector logic 140, to configure which types of notifications the user wishes to receive from service 102, as messages within the user's inbox. This is done through a configuration user experience (UEX) which is described in greater detail below.

Connector support logic 152 also acts in conjunction with connector logic 140 to allow a user to perform actions on or within service 102, or using service 102, from with the user's inbox in the user's e-mail system. Thus, in order to perform such actions, the user need not navigate away from the e-mail system to a site hosted by the service, and then use the UI elements exposed by the service. Instead, actionable messages can be provided to the user from the service, within the user's inbox. The actionable messages illustratively have actuatable controls that can be actuated by the user in order to perform actions within the service that spawned the actionable message.

Interaction bot logic 156 illustratively receives user inputs that have natural language or conversational inputs, and processes those inputs to identify an action that the user wishes to perform within service 102. The inputs can be received as electronic mail messages (e.g., simple mail transfer protocol (SMTP) messages), as notifications (e.g., hypertext transfer protocol (HTTP) posts), or in other ways. Bot logic 156 illustratively exposes a conversational interface that parses the natural language inputs to identify actions to be taken within service 102 and it performs those actions. It can also return a result or a response to the user, once the actions have been performed. Similarly, it illustratively has disambiguation logic so that, should any part of the requested action be ambiguous, it can conduct a conversation with the user in order to disambiguate the ambiguous portions. Logic 156 is described in more detail below with respect to FIG. 8.

Figure 2:
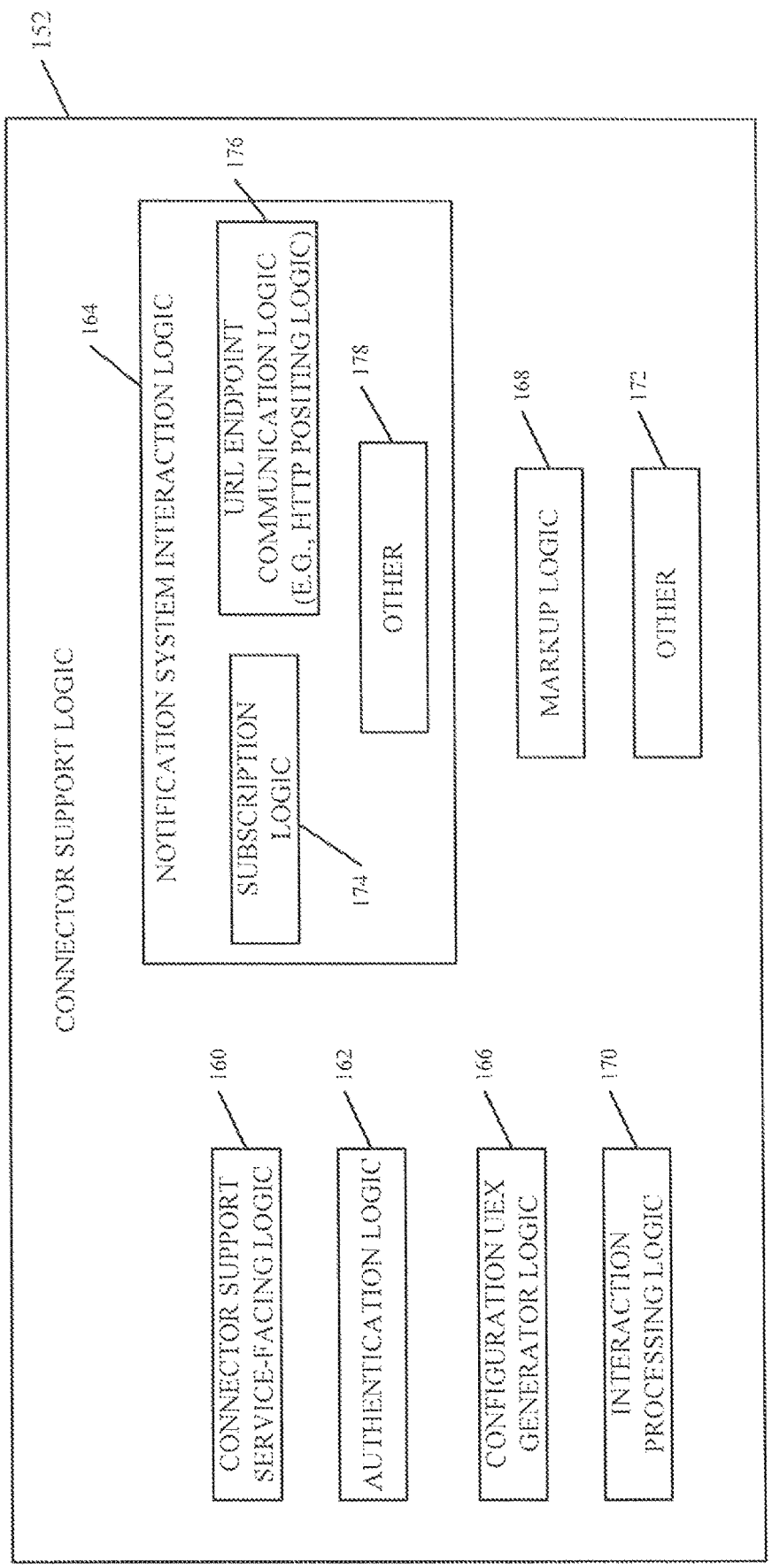
FIG. 2 is a block diagram showing one example of connector support logic in more detail.

FIG. 2 is a block diagram showing one example of connector support logic 152, in more detail. In the example illustrated, connector support logic 152 illustratively includes connector support service-facing logic 160, authentication logic 162, notification system interaction logic 164, configuration UEX generator logic 166, mark-up logic 168, interaction processing logic 170, and it can include other items 172.

Connector support service-facing logic 160 illustrative interacts with service 102 in order to perform actions, based upon user inputs provided through the user's e-mail service 108. Thus, logic 160 will vary based upon the configuration of the service 102, based upon how the service operates, how it is designed, among other things.

Authentication logic 162 illustratively authenticates the user to the service, for instance, if the user is not logged in. By way of example, it may be that the user attempts to configure service 102 to send particular notifications. However, it may also be that the user is not logged into the service, or has not been authenticated to the service. In that case, as is described in greater detail below, authentication logic 162 conducts an authentication UEX to allow the user to authenticate himself or herself to the service so that he or she can perform the configuration or other actions within the service.

Configuration UEX generator logic 166 illustratively generates the particular configuration UEX that the service 102 desires to conduct for the user, to allow the user to configure the service to send certain notifications to the user's inbox. Again, the particular UEX (and thus the generator logic 166) will vary based upon the type of notifications that are generated by service 102, the type of notifications that the service wishes to allow the user to configure, and a variety of other things.

Notification system interaction logic 164 illustratively includes subscription logic 174, uniform resource locator (URL) endpoint communication logic 176, and it can include other items 178. Subscription logic 174 illustratively interacts with the notification system 150 in service 102 to indicate that the user has subscribed to certain notifications. For instance, once the user goes through the configuration process, the user will have identified certain notifications, or types of notifications, that the user wishes to receive from the service through his or her inbox. In that case, subscription logic 174 interacts with notification system 150 to subscribe the user to those particular notifications. In response, the notification system 150 will determine that the user is associated with a particular URL endpoint, and this will be communicated to the connector logic 140, for this user, by URL endpoint communication logic 176. Similarly, when the notification system 150 for service 102 generates a notification that the user has subscribed to, URL endpoint notification logic 176 may include posting logic that posts the notification, using an HTTP post, to the URL endpoint corresponding to the user who has subscribed to the notification.

Mark-up logic 168 illustratively marks up the notification so that it can be rendered in the user's e-mail system, according to a pre-defined schema. In one example, the mark-up logic marks up the notification in a JSON format or as a JSON string, so that no rendering code needs to be provided by the service 102. Instead, the JSON string can be rendered by the e-mail service 108 or the client e-mail component 132, without receiving any specific rendering information, other than the JSON string.

Table 1 shows one example of an actionable message represented in JSON format. In Table 1, a message card represents the actionable message and it has an action card in it, as part of a potential action property. The specific action represented by the action card in Table 1 is a "move" action. The "move" action is a multi-step action that first allows the user to select from a list and then specify the move. The JSON markup identifies a target API to be called for each step.

TABLE 1

```
{
    "@type": "MessageCard",
    "summary": "Miguel G. commented on Acme ",
    "title": "Project Tango",
    "sections": [
        {
            "activityTitle": "Miguel G. commented",
            "activitySubtitle": "On Project Tango",
            "activityText": "Here are the designs",
            "activityImage": "http://...",
        },
        {
            "title": "Details",
            "facts": [
                {
                    "name": "Labels",
                    "value": "Designs, redlines"
                },
                {
                    "name": "Due date",
                    "value": "Dec 7, 2016"
                },
                {
                    "name": "Attachments",
                    "value": "[final.jpg](http://...)"
                }
            ]
        },
        {
            "title": "Images",
            "images": [
                { "image": "http://..." },
                { "image": "http://..." },
                { "image": "http://..." }
            ]
        }
    ],
    "potentialAction": [
        {
            "@type": "OpenUri",
            "name": "View in Acme ",
            "target": [ { "os": "default", "uri": "https:// Acme.com/c/1101/" } ]
        },
        {
            "@type": "ActionCard",
            "name": "Move",
            "inputs": [
                {
                    "@type": "MultiChoiceInput",
                    "id": "abc",
                    "title": "Pick a list",
                    "choices":
                    {
                        "@type": "HttpGET",
                        "target": "https://api. Acme.com/getBoards?..."
                    },
                    "isRequired": "true"
                }
            ],
```

TABLE 1-continued

```
        "actions": [
            {
                "@type": "HttpGET",
                "name": "Move",
                "target": "http://api. Acme.com/setList?={{abc.value}}"
            }
        ]
    },
    {
        "@type": "ActionCard",
        "name": "Comment",
        "inputs": [
            {
                "@type": "TextInput",
                "id": "def",
                "title": "Enter your comment",
                "isMultiline": "true",
                "isRequired": "true"
            }
        ],
        "actions": [
            {
                "@type": "HttpPOST",
                "name": "Send",
                "target": "http://api. Acme.com/.../comment&cardId=abc",
                "body": [
                    {
                        "propertyName": "comment",
                        "propertyValue": "{{def.value}}"
                    }
                ]
            }
        ]
    }
]
}
```

It may also be that the particular notification that is generated and rendered in the user's inbox may be an actionable notification. In that case, it will have actuatable user input mechanisms (such as a button, a text box, or a variety of other user actuatable items) that the user can interact with in order to preform actions within service 102. Interaction processing logic 170 detects those user interactions and takes steps needed to perform those actions within service 102.

Connector logic 140 illustratively includes configuration UEX surfacing logic 180, notification endpoint logic 182, notification mark-up parsing logic 184, inbox and group integration and threading logic 186, notification rendering logic 188, notification interaction logic 190, and it can include a wide variety of other items 192. Configuration UEX surfacing logic 180 illustratively includes service identifier 181 that identifies services that the user can configure, and service selector 183 that surfaces the identified services for user selection. Logic 180 then surfaces the configuration UEX generated by generator logic 166 (shown in FIG. 2) for user interaction. It can thus walk the user through a configuration experience that allows the user to configure service 102 to provide desired notifications to the user, through the user's inbox.

Notification endpoint logic 182 illustratively receives the notifications as the HTTP posts that are provided by the notification system 150 in service 102, when a notification is generated. Notification endpoint logic 182 can receive the post in the form of the mark-up generated by mark-up logic 168 (shown in FIG. 2).

Notification mark-up parsing logic 184 illustratively parses the notification mark-up to identify the various pieces of the notification that are to be rendered. It can, for example, identify items that are simply to be displayed, or action buttons or actuatable mechanisms, that can be actuated by the user to perform the actions, or a wide variety of other items.

Inbox integration and threading logic 186 can identify whether the present notification should be placed in a conversation thread with other notifications that have been received from service 102. For example, if a variety of different notifications have been received, but they all relate to a particular bug or bug fix, they may be identified as notifications that are part of a common thread, and the corresponding email messages may be thus placed in a conversation thread within the user's inbox. In one example, service 102 will illustratively include threading information in the marked up notification to identify whether the notification belongs in a thread or is to be placed in a conversation thread with other notifications. The threading can be performed in other ways as well.

Notification rendering logic 188 then renders the notification, as a message within the user's inbox. Where it is an actionable message, the user actuatable elements will be rendered as well, and they will be active so that the user can take actions within service 102, without ever leaving the user's inbox.

Notification interaction logic 190 can include interaction detector 194, endpoint identifier logic 196, endpoint interaction logic 198, and a wide variety of other things 200. Interaction detector 194 illustratively detects user interaction with a rendered notification. This can include detecting that the user has actuated one of the user actuatable elements (such as by actuating a button, inputting natural language text, etc.) or in other ways. These are only some examples of user interactions that can be detected by interaction detector 194.

Endpoint identifier logic 196 then identifies an endpoint that is to be interacted with, based upon the user interaction. For instance, it may be that service 102 provides an end point that is to be interacted with when the user interacts with a given actuatable element. In that case, once the user interaction is detected, endpoint identifier logic 196 identifies the particular endpoint that is to be interacted with, based upon the detected user interaction. Endpoint interaction logic 198 then interacts with that endpoint, in a desired way. For instance, it may be that, once the user actuates a user actuatable element, the connector logic 140 is to call a particular application programming interface (API). In that case, when the user actuates that element, endpoint interaction logic 198 calls that API, providing it any needed information obtained from the detected user interaction. By letting the service identify an endpoint to call to perform an action, and then allowing the service, at that endpoint, to take the action itself, this can enhance the security of the service. Again, this is only one example of how endpoint interaction logic 198 can interact with a desired endpoint, based upon a detected user interaction.

Figure 4:
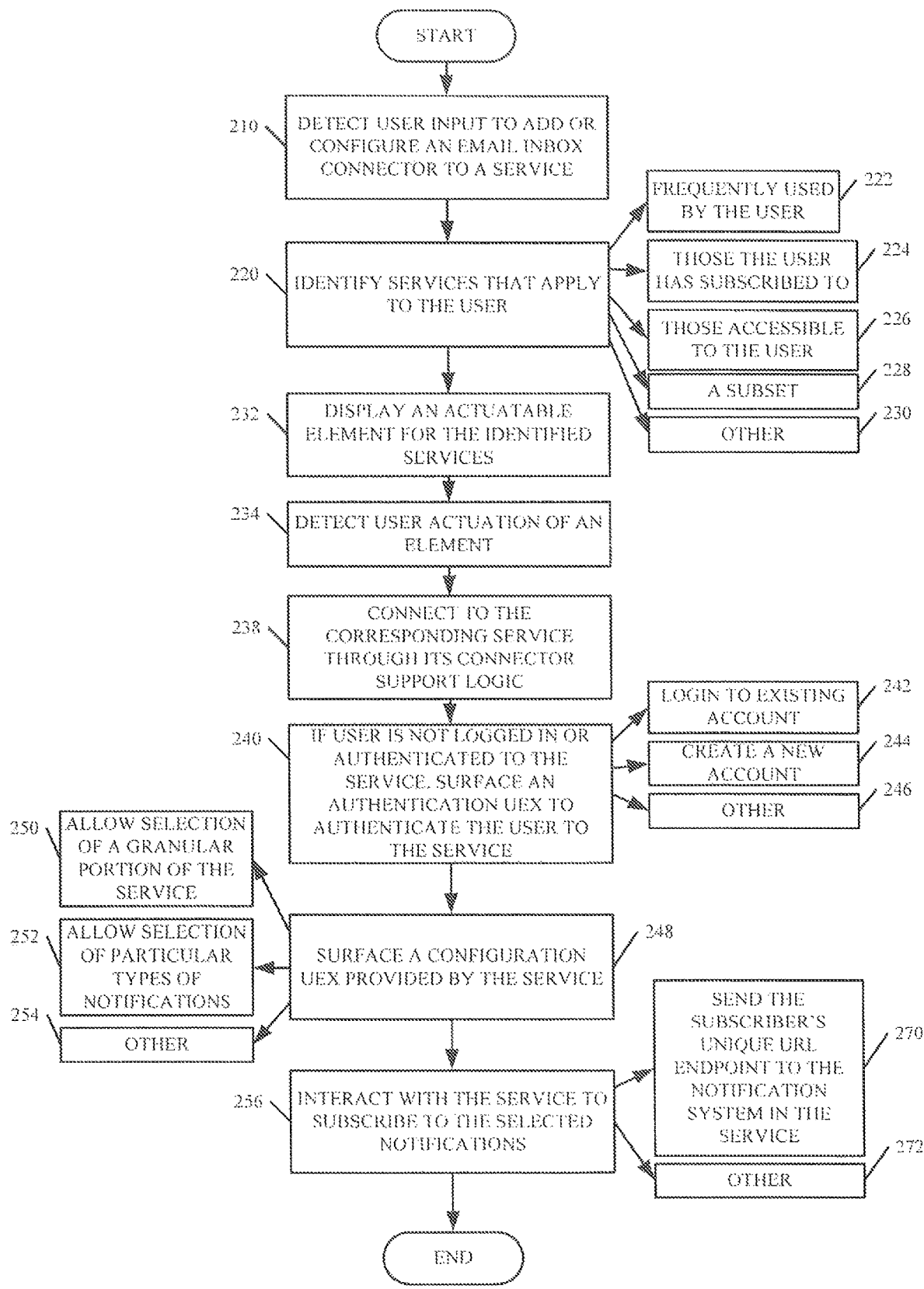
FIG. 4 is a flow diagram illustrating one example of the operation of the architecture shown in FIGS. 1-3 in surfacing a configuration user experience.

FIG. 4 is a flow diagram illustrating one example of the operation of the remote server environment 106, connector logic 140 and connector support logic 152 in allowing user 126 to configure a particular service 102 to receive desired notifications from that service. It is first assumed that the user is operating in his or her e-mail system 108. Connector logic 140 then detects a user input indicating that the user wishes to add a connector to a service 102, or configure an already existing connector, in the user's e-mail inbox. This is indicated by block 210 in FIG. 4.

Figures 4A, 4B, 4C:
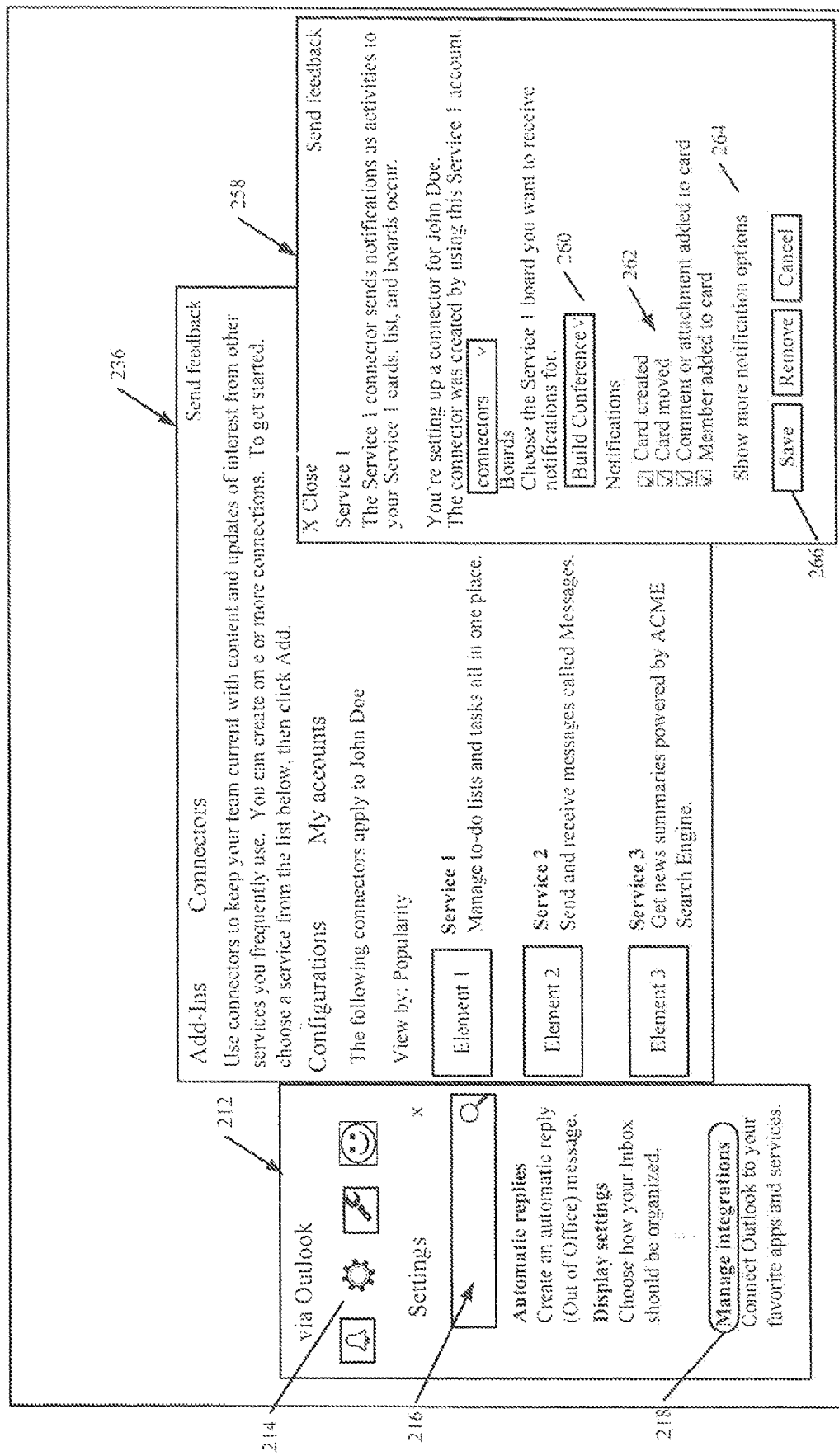
FIGS. 4A-4C show examples of user interfaces that can be generated in the configuration user experience.

In one example, the user can actuate a settings user input mechanism and then choose a particular item to manage the user's connectors. FIG. 4A, for instance, shows a user interface display 212 indicating this. In user interface display 212, the user has actuated a settings user input mechanism 214 which then displays a set of options 216 that the user can select from, in order to manage the user's settings. In one example, a "manage integrations" user input mechanism 218 is provided, and when this is actuated, configuration UEX surfacing logic 180 in connector logic 140 interacts with configuration UEX generator logic 166 in connector support logic 152 to surface a user experience that allows the user to add or configure connectors to the user's e-mail inbox.

Service identifier logic 181 then identifies the services that apply to the particular user 126 who will be configuring a connector. This is indicated by block 220 in the flow diagram of FIG. 4. In one example, service identifier 181 identifies the various services 102-104 that are frequently used by user 126. This is indicated by block 222. In another example, service identifier 181 can identify all services that the user has subscribed to. This is indicated by block 224. It can identify those services that the user has access to, as indicated by block 226, or a subset of the various services available to the user, as indicated by block 228. It can identify services that the user can configure in other ways as well, and this is indicated by block 230.

Service selector 183 then displays an actuatable element for the identified services so that the user can select a particular service that the user wishes to configure. Displaying an actuable element for the identified services is indicated by block 232, and detecting user actuation of one of those elements, to select a service for configuration, is indicated by block 234.

FIG. 4B shows one example of a user interface display 236 that indicates this. In FIG. 4B, it can be seen that service identifier 181 has identified a plurality of services (labeled Service 1, Service 2, Service 3). Service selector 183 has generated a user actuable element for each service (labeled Element 1, Element 2, Element 3). The user can then actuate one of those elements, and configuration UEX surfacing logic 180 will interact with the configuration UEX generator logic 166 on the selected service, to surface a configuration user experience that allows the user to add or manage connectors from the user's e-mail inbox to that service.

Thus, once the user has actuated one of the user actuatable elements, configuration UEX surfacing logic 180 connects to the corresponding service through its configuration UEX generator logic 166, in the configuration support logic 152 for that service. This connection is indicated by block 238 in the flow diagram of FIG. 4.

It may be that user 126 is already logged into the selected service, and thus has been authenticated to the service. If not, authentication logic 162 in the connector support logic 152 of the selected service surfaces an authentication experience that allows the user 126 to authenticate himself or herself to the selected service, so that the user can configure that service. This is indicated by block 240 in the flow diagram of FIG. 4. Authentication logic 162 may ask the user to log into an existing account on the service as indicated by block 242. It may allow the user to create a new account to the selected service as indicated by block 244, or it may authenticate the user to the service in other ways, as indicated by block 246.

Once the user is authenticated to the selected service, configuration UEX generator logic 166 provides configuration UEX information to the configuration UEX surfacing logic 180 in the connector logic 140 in the user's e-mail service 108. Configuration UEX surfacing logic 180 then surfaces the configuration UEX to the user to allow the user to configure a connector for the service. Surfacing the configuration UEX provided by the service is indicated by block 248 in FIG. 4. In one example, it allows the selection of a granular portion of the service for which notifications can be selected. This is indicated by block 250. It can allow the selection of particular types of notifications as indicated by block 252, or it can provide other user experience functionality as well, as indicated by block 254.

The user then interacts with the service, through the configuration UEX, to subscribe to selected notifications that are generated from the service, and that the user wishes to have surfaced as e-mail messages in the user's inbox. Interacting with the service to subscribe to notifications is indicated by block 256 in the flow diagram of FIG. 4.

FIG. 4C shows one example of a user interface display 258 that indicates this. User interface display 258 allows the user to select a particular granularity for which notifications are to be sent. In the example shown in FIG. 4C, the service provides a granularity for notification selection in terms of "boards". The user can thus select a particular "board" for which the user wishes to receive notifications, such as by using a drop down menu control illustrated by 260 in FIG. 4C.

It will be appreciated that the granularity may vary widely based on the service. It may be based on hashtag identifiers, subject matter identifiers, keywords or other things.

The configuration UEX for this service then surfaces the various notification types that the user can select from, as indicated by block 262. It can be seen that, in the present example, the user has selected all notification types including "Card Created", "Card Moved", "Comment or Attachment Added to Card", and "Member Added to Card". In one example, an additional user input mechanism 264 is also surfaced that allows the user to see additional notifications that the user may wish to subscribe to.

Once the user has selected the various notification types that the user wishes to subscribe to, the user can save that configuration by actuating a user actuatable display element, such as the "save" actuator 266 shown in FIG. 4C. Once the user has interacted with a user actuatable element to select notifications and save them, subscription logic 174 in notification system interaction logic 164 interacts with the subscription logic in notification system 150 indicating that the user wishes to receive the selected notifications, when they are generated by system 150.

When that happens, notification endpoint logic 182 in connector logic 140 sends the subscriber's unique URL endpoint to the notification system 150 in the service, through URL endpoint communication logic 176. Thus, whenever the notification system 150 in service 102 generates one of the selected notifications, URL endpoint communication logic 176 generates an HTTP post to the subscriber's unique URL endpoint, indicative of that notification. Logic 176 can be part of notification system 150 or separate from it, and the posting operation is described in greater detail below.

Sending the subscriber's unique URL endpoint to the notification system in the service is indicated by block 270 in the flow diagram of FIG. 4. The subscription can be performed in other ways as well, and this is indicated by block 272.

Figure 5:
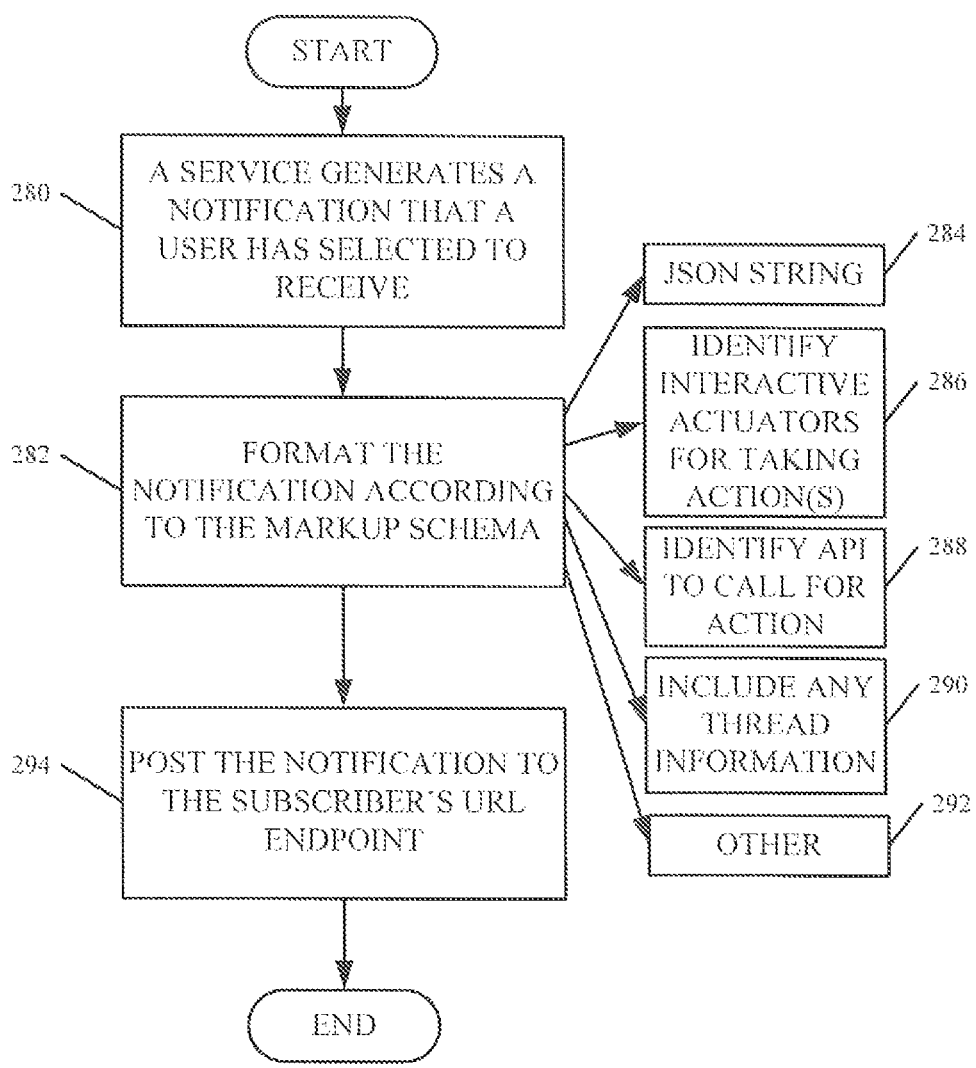
FIG. 5 is a flow diagram showing one example of the operation of the architecture illustrated in FIGS. 1-3 in processing a notification on a service connector.

FIG. 5 is a flow diagram illustrating one example of how the service 102 and connector support logic 152 can interact with connector logic 140 to surface a notification as an e-mail message in the user's inbox, once it is generated by notification system 150 in service 102. The notification system 150 first generates a notification that user 126 has subscribed to (or has selected to receive). This is indicated by block 280 in the flow diagram of FIG. 5.

Mark-up logic 168 then formats the notification according to a mark-up schema that can be parsed by connector logic 140 in e-mail service 108. Formatting the notification according to such a mark-up schema is indicated by block 282 in FIG. 5. In one example, the mark-up schema can be provided as a JSON string 284. It can identify interactive actuators for taking actions on the notification as indicated by block 286. It can identify a particular endpoint (such as an API) to call to perform actions, based upon user interaction with one of the actuators. This is indicated by block 288. It can include any threading information which allows this particular notification message to be threaded with other messages in the user's inbox, as indicated by block 290. The format can include a wide variety of other things as well, and this is indicated by block 292.

Once the notification has been formatted according to the expected schema, URL endpoint communication logic 176 posts it to the subscriber's unique URL endpoint. This is indicated by block 294 in the flow diagram of FIG. 5.

Figure 6:
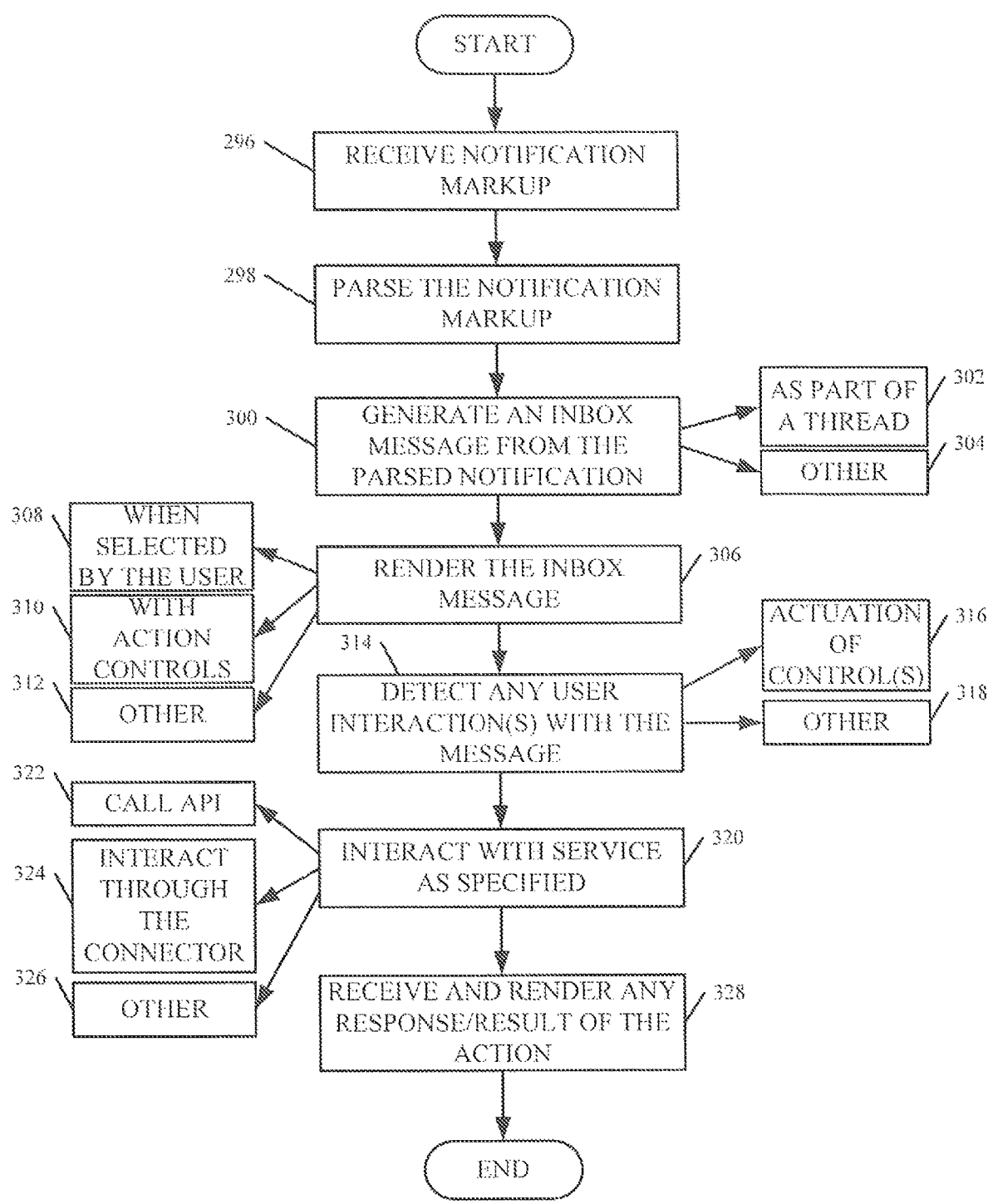
FIG. 6 is a flow diagram illustrating one example of the operation of the architecture shown in FIGS. 1-3 in processing a received notification at an e-mail system.

FIG. 6 is a flow diagram illustrating one example of the operation of connector logic 140, once it receives an indication that a notification has been posted by the notification system 150 in service 102, to the unique URL endpoint of this particular subscriber. Notification endpoint logic 182 first receives an indication that a notification message has been posted to the unique URL endpoint. It retrieves the notification and provides it to notification mark-up parsing logic 184 as indicated by block 296 in the flow diagram of FIG. 6.

Parsing logic 184 then parses the notification mark-up as indicated by block 298. In doing so, it identifies various portions of the notification, based upon the mark-up, and generates an inbox message from the parsed notification. This is indicated by block 300 in the flow diagram of FIG. 6.

Inbox integrating and threading logic 186 can integrate the message into the inbox of the user's e-mail service. It can also, based upon the mark-up information, identify whether the particular message should be threaded with any other notification messages in the user's inbox. For instance, the mark-up may include a thread identifier that identifies a thread that the notification belongs to. The corresponding email message can then be threaded with other messages that have the same thread identifier. This is indicated by block 302. It can generate the e-mail message in the user's inbox in other ways as well, and this is indicated by block 304.

Notification rendering logic 188 then renders the e-mail message in the user's inbox. This is indicated by block 306. When the message is selected by the user, it can render the entire content of the e-mail message, as indicated by block 308. If the notification includes action controls that can be actuated by the user to perform actions relative to the notification, from within the user's inbox, those action controls are rendered and active as well. This is indicated by block 310. The message can be rendered in other ways as well, as indicated by block 312.

Interaction detector 194 then detects any user interactions with the notification message. This is indicated by block 314. For instance, it may be that the user actuates one of the user actuatable controls that were identified in the parsed notification message and rendered for user interaction. Actuation of one of those controls is indicated by block 316. User interactions can be detected in other ways as well, as indicated by block 318.

Endpoint identifier logic 196 then identifies any endpoint that is to be interacted with, based upon the detected user interaction, and endpoint interaction logic 198 interacts with the service 102 that generated that notification, through the identified endpoint. Interacting with the service as specified is indicated by block 320 in the flow diagram of FIG. 6. In one example, endpoint interaction logic 198 can call a specified API as indicated by block 322. It can interact through the connector support logic 152, such as through interaction processing logic 170. This is indicated by block 324. It can interact with the service directly or in other ways as well, as indicated by block 326.

In one example, the service generates a result or a response corresponding to the user interaction. Notification rendering logic 188 can receive that response and render it as well. This is indicated by block 328 in the flow diagram of FIG. 6. FIGS. 6A-6E show examples of user interface displays that indicate this.

It will also be noted that the protocol used by the connector logic 140 and connector support logic 152 to interact with each other can include other items. For instance, the protocol can call for the connector logic 140 to store any original markup it receives, along with any user interactions, service responses or results, etc. This history can be displayed so users can see this history relative to any action, or it can be accessed by other systems. Further, when connector logic 140 calls a service endpoint, it illustratively includes an identifier identifying who is calling, any authorization tokens, for the caller, and the payload information. It can include other information as well.

Figure 6A:
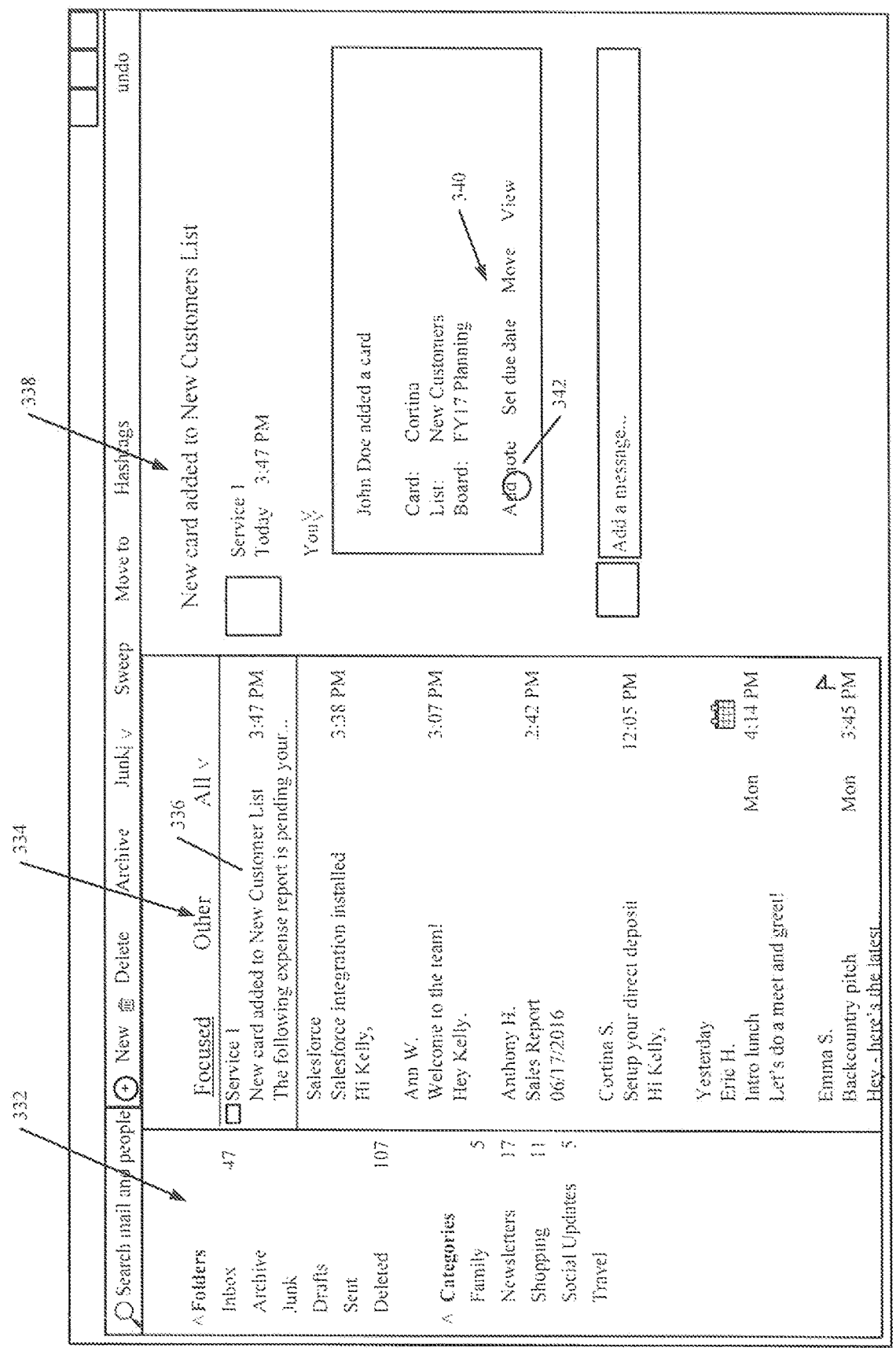
FIGS. 6A-6E show examples of user interface displays.

FIG. 6A shows one example of a user interface display 330 that can be generated by the user's e-mail service. Display 330 includes a first pane 332 that allows the user to perform certain actions within the e-mail service, such as arranging folders, arranging categories, etc. It also includes a message pane 334 that displays received messages. It can be seen that the system has now received a notification message 336 from Service 1. Display 330 also includes a reading pane 338 that allows the user to read the content of the messages listed in message pane 334, when they are selected by the user. It can be seen in FIG. 6A that the user has selected message 336, and its contents are now displayed in reading pane 338. The content is rendered based on the parsed mark-up, representing the notifications received from the service 102.

The message is a notification that a user has added a card in service 102 (which corresponds to "Service 1" in the display). Recall that this is one of the notifications that the user subscribed to as discussed above. It can also be seen that the notification includes a plurality of user actuatable elements 340, that can be actuated by the user in order to perform an action, within Service 1, from within the inbox display 330 of the user's e-mail service. In one example, the user actuatable elements 340 allow the user to add a note, set a due date, or perform "move" or "view" actions.

Figure 6B:
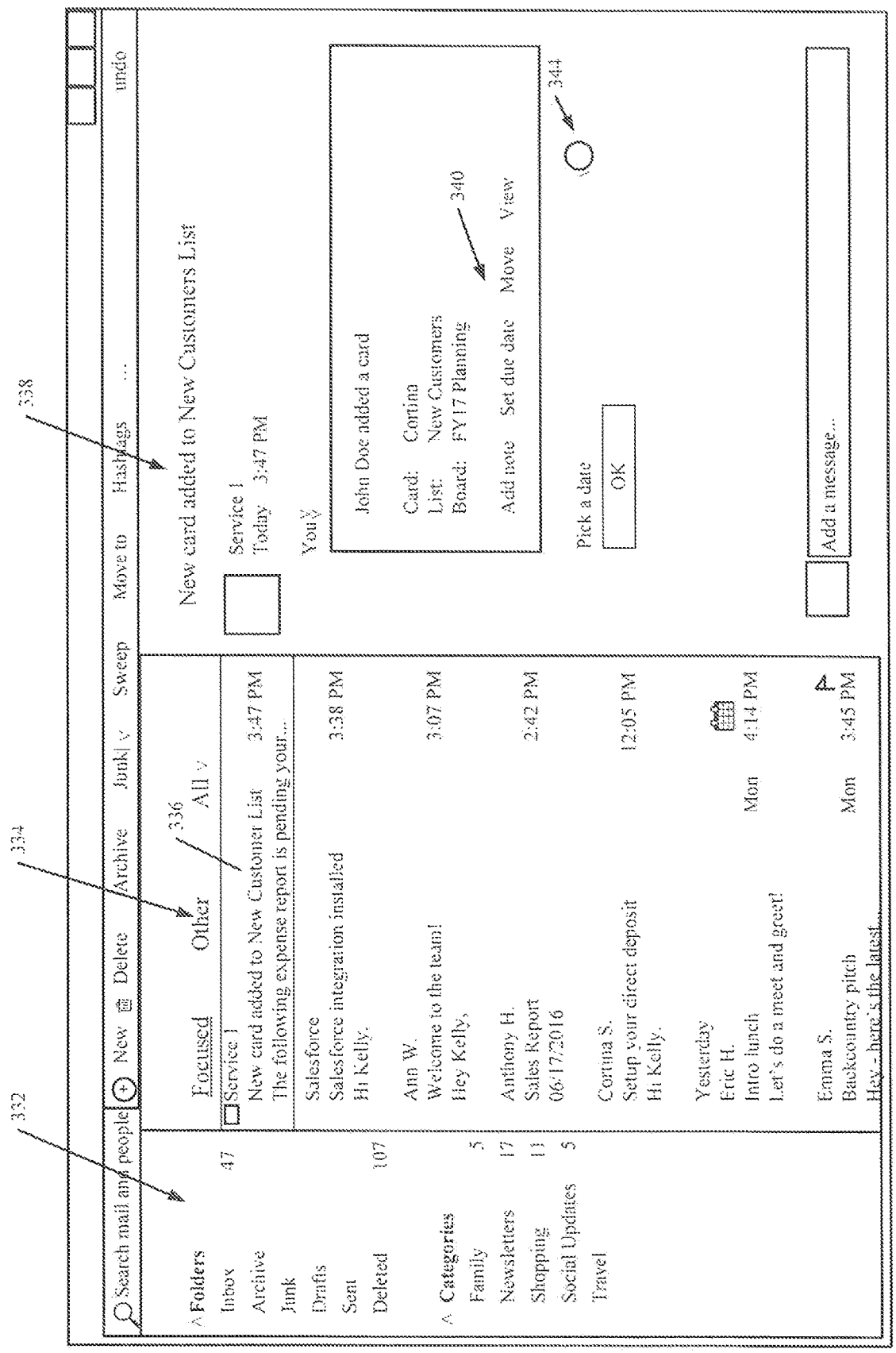

In the present example, assume that the user has actuated the "set due date" element 342. In that case, this user interaction is detected by interaction detector 194. Endpoint identifier logic 196 identifies the endpoint in the service 102 to call and endpoint interaction logic 198 calls that endpoint. In the present example, it is assumed that the endpoint instructs the connector logic 140 to display a date picker. FIG. 6B is similar to FIG. 6A, and similar items are similarly numbered. However, in FIG. 6B, it can now be seen that a date picker user input mechanism 344 is displayed. Mechanism 344 allows the user to select and confirm a date as the due date for the card added as described above.

Figure 6C:
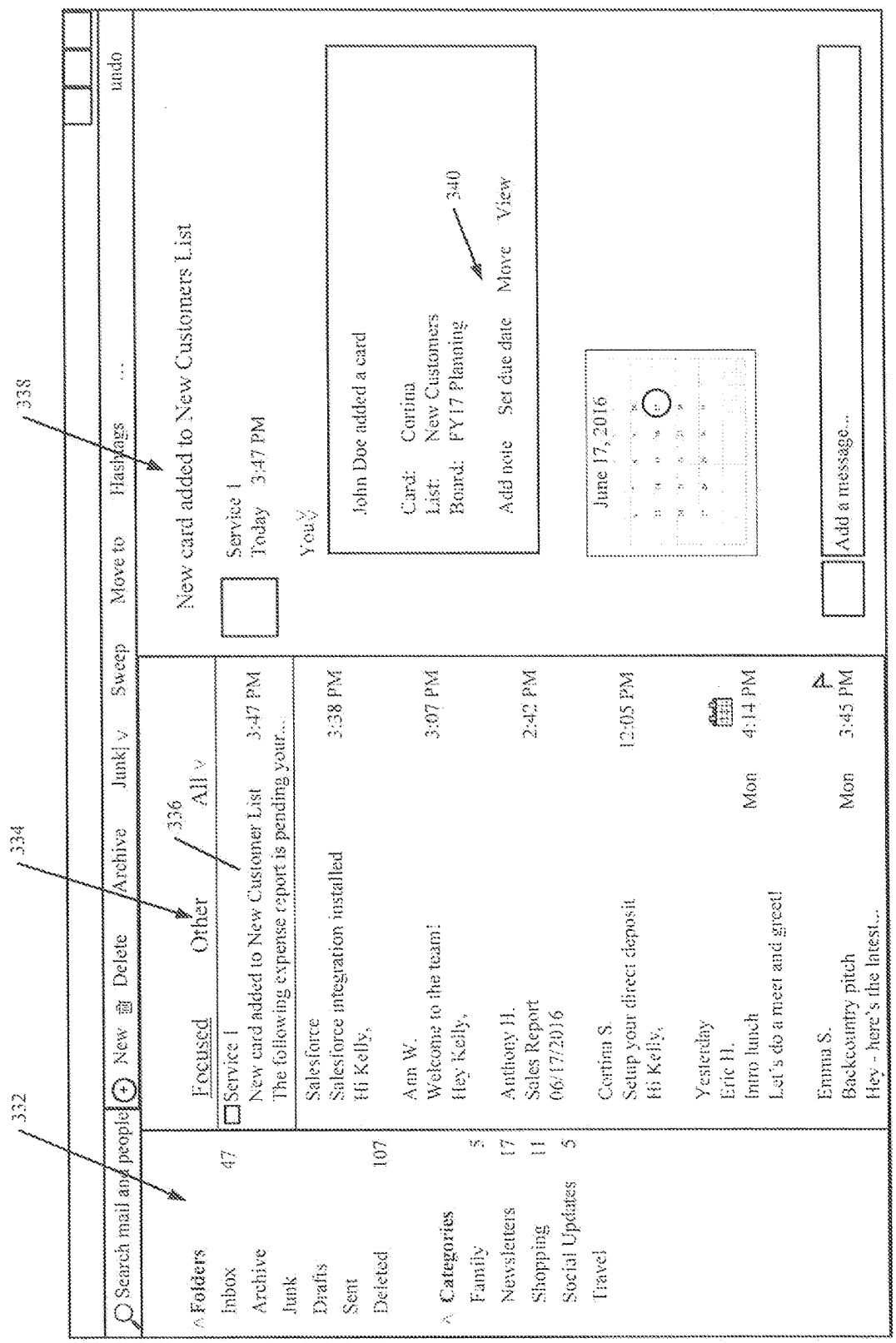
Figure 6D:
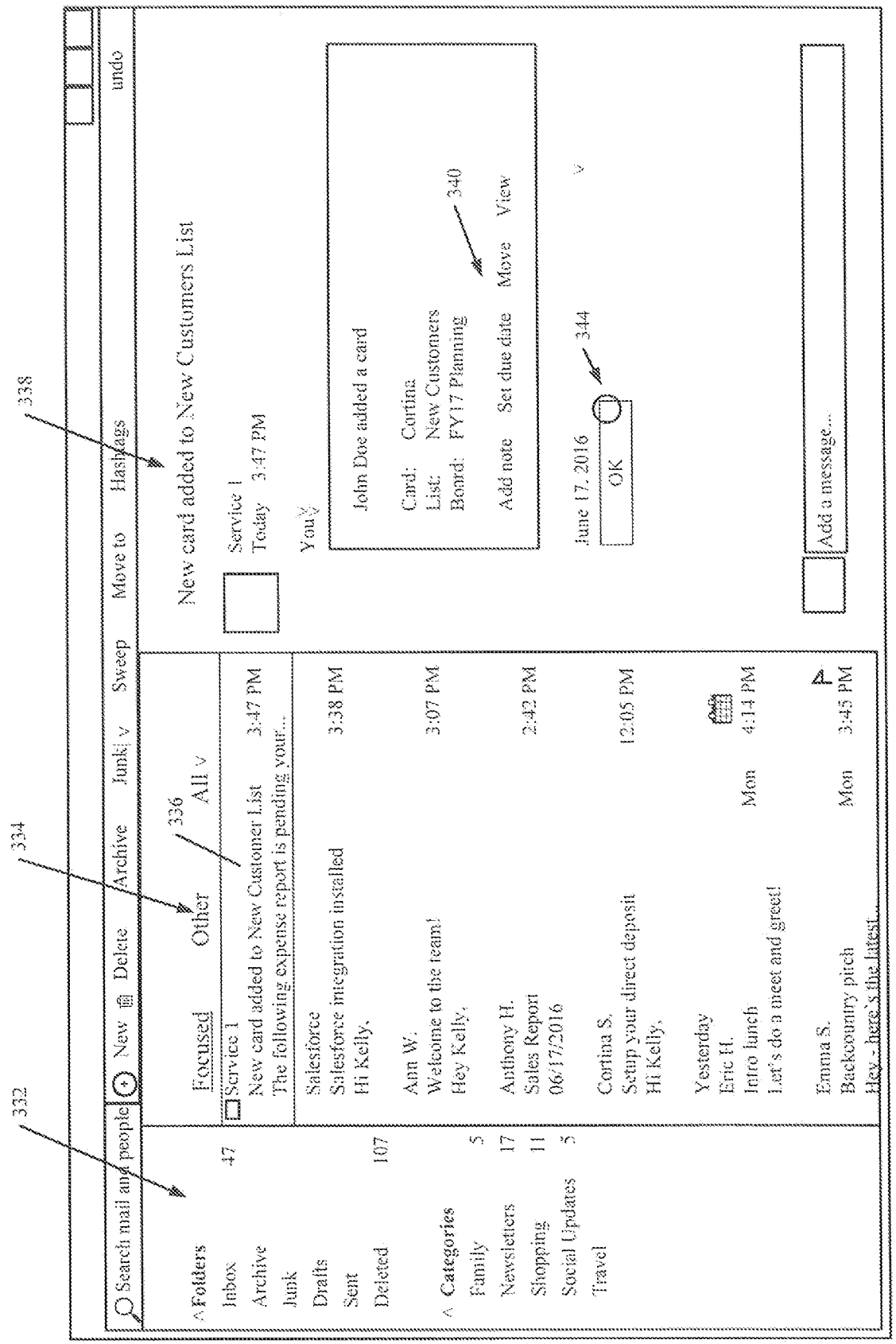
Figure 6E:
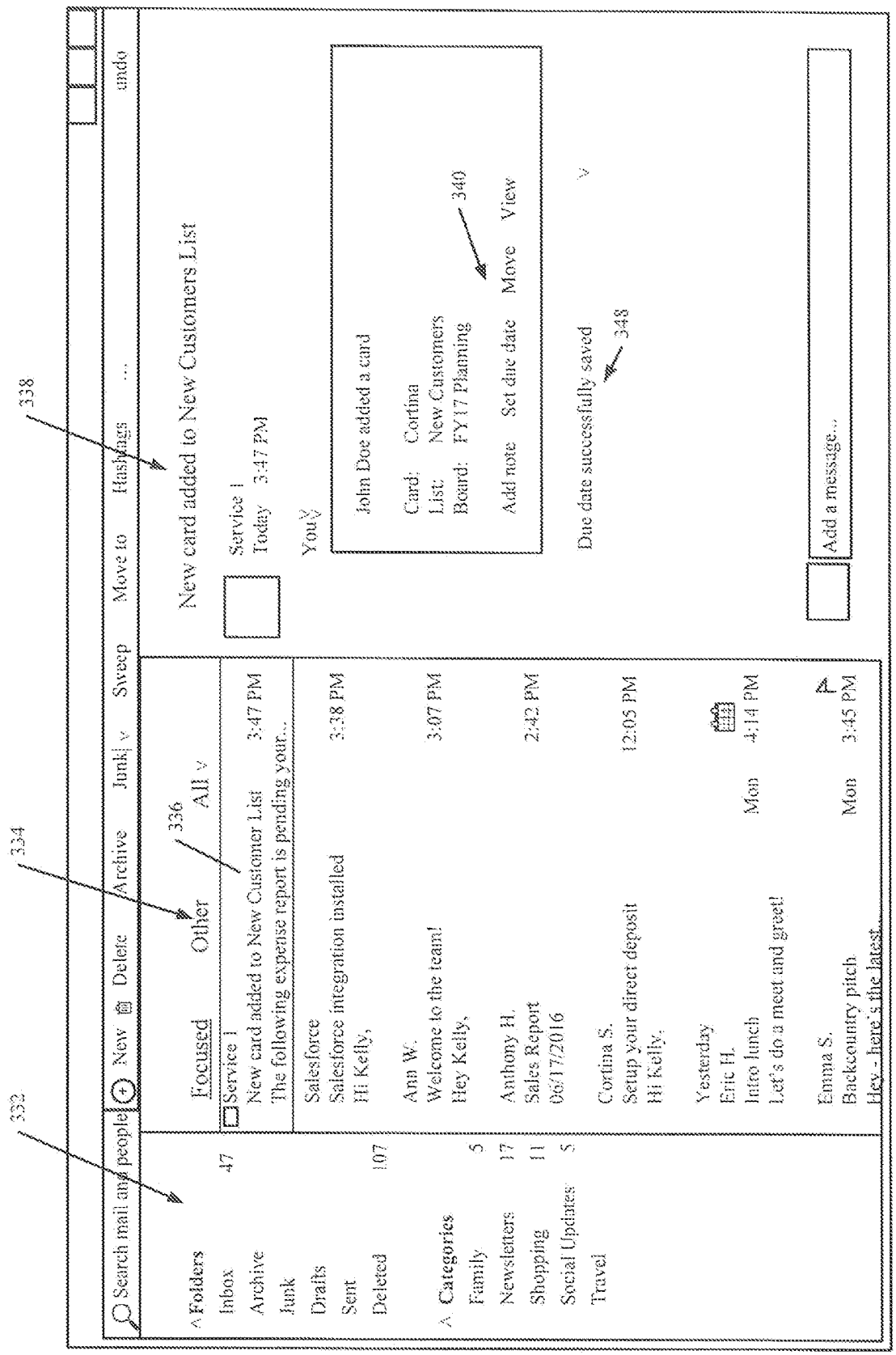

FIG. 6C shows that the user has now selected a date using the date picker, and FIG. 6D shows that the user is confirming the selected date by actuating the "OK" user input mechanism 346. In response, endpoint interaction logic 198 calls a specified API on service 102 (with the picked date) that is used to set a due date in service 102. FIG. 6E shows that the service has now taken the appropriate action of identifying the selected date as the due date, and it has responded with a response shown generally at 348. The response is "Due Date Successfully Saved".

Figure 7:
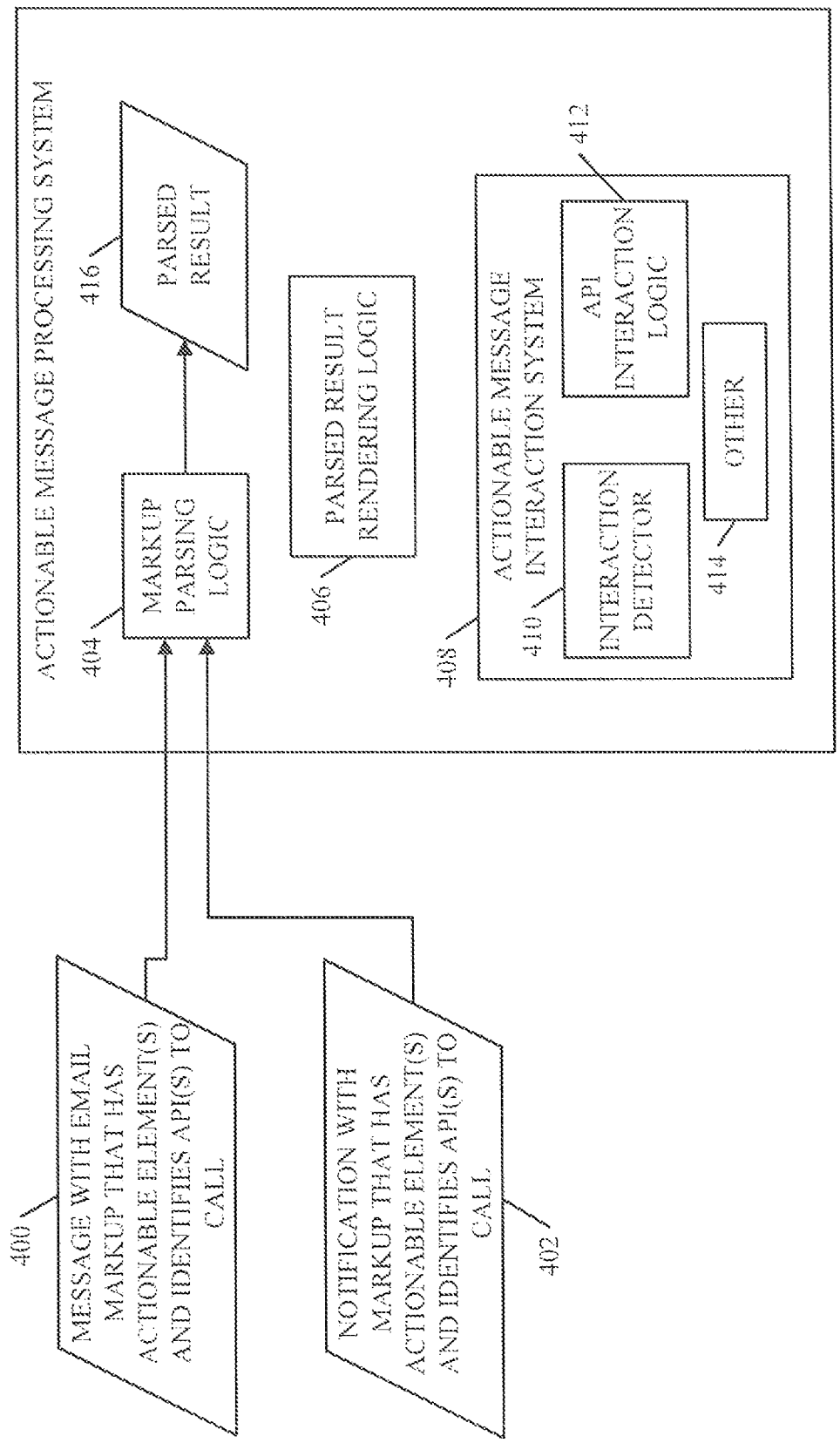
FIG. 7 is a block diagram showing one example of an actionable message processing system that can process actionable messages received as e-mail messages or as notifications.

FIG. 7 is a block diagram showing one example of actionable message processing logic 142, which can be part of connector logic 140, or it can be a separate item within e-mail service 108. In the example illustrated in FIG. 7, it can be seen that actionable message processing system 142 can receive an e-mail message with a mark-up that has actionable elements and identifies APIs to call in response to actuation of one of those elements. Thus, the e-mail message, itself can allow the user to perform actions by actuating one of those elements. The e-mail message is indicated by block 400.

It can also be seen in the example illustrated in FIG. 7, that system 142 can receive a notification (as opposed to an e-mail message) with a mark-up that has actionable elements and that identifies APIs to call in response to user actuation of one of those elements. The notification is indicated by block 402. Thus, it can be seen in FIG. 7 that system 142 can receive an actionable message as an e-mail message (or SMTP message), or as a notification (or using HTTP posting). In either case, it is assumed that the mark-up of the message is according to a predefined schema that is expected by actionable message processing system 142.

Figure 3:
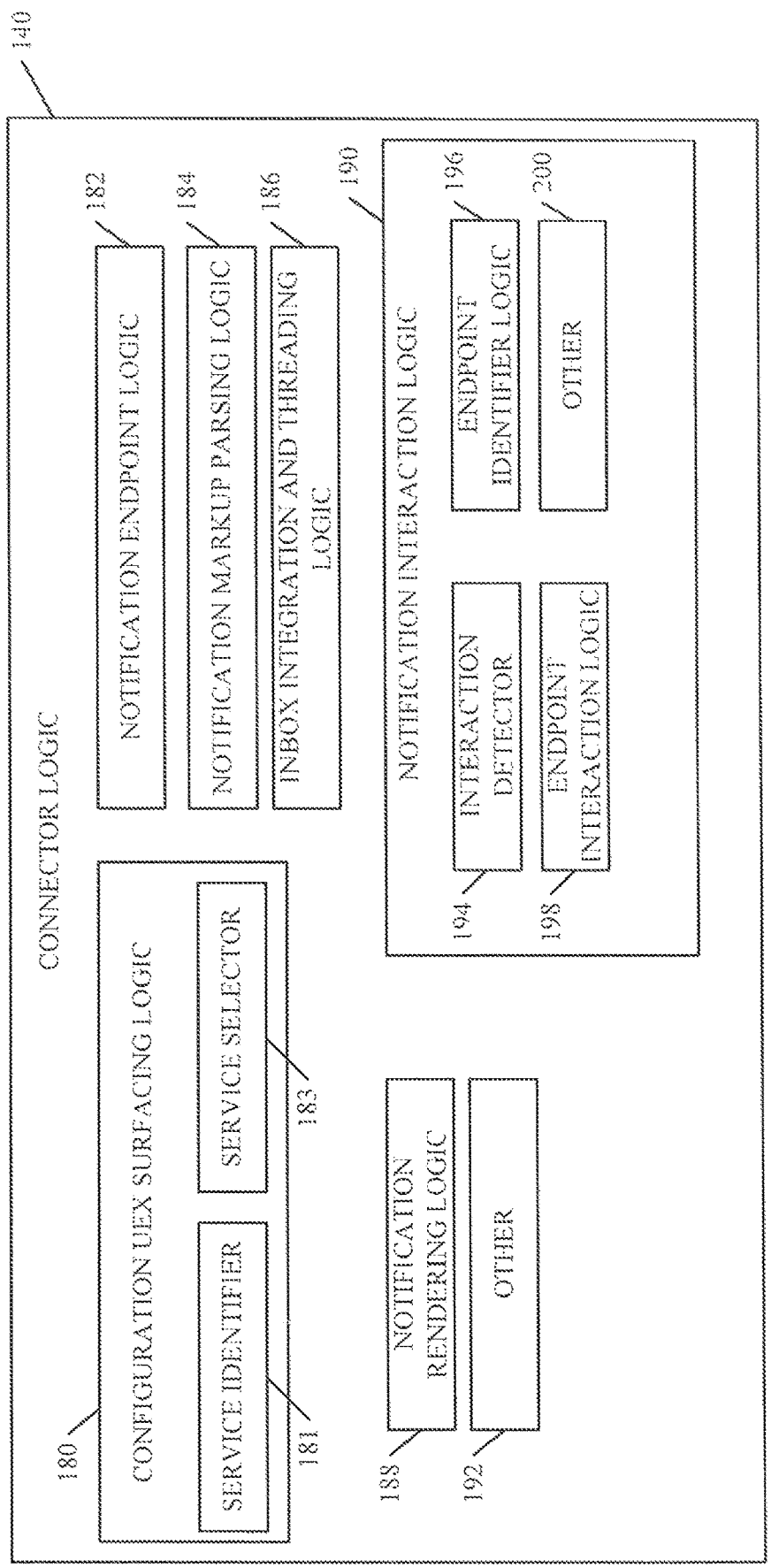
FIG. 3 is a block diagram showing one example of connector logic in more detail.

In FIG. 7, system 142 illustratively includes mark-up processing logic 404, parsed result rendering logic 406, and interaction logic 408 (which, itself, includes interaction detector 410, API interaction logic 412, and it can include other items 414). Mark-up parsing logic 404 can be the same as, or different from, the notification mark-up parsing logic 184 shown in FIG. 3. It illustratively understands the mark-up with which messages 400 and/or 402 are schematized. It can parse that mark-up to identify a parsed result 416. The parsed result, once it is parsed, indicates how it the message is to be rendered within the user's e-mail inbox. Parsed result rendering logic 406 can be the same as notification rendering logic 188, or it can be different. Regardless, it understands how to render the parsed result 416 and does so.

Interaction logic 408 can be the same as, or different from, notification interaction logic 190. Interaction detector 410 illustratively detects user interaction with any of the actionable elements that are rendered. API interaction logic 412 then calls the identified API, that is associated with, or corresponds to, the user actuatable element that the user has interacted with. In doing so, logic 412 illustratively performs the desired action (corresponding to the user actuatable element that was actuated by the user) within the service that generated the message.

FIG. 7 thus shows that, even if no connector logic 140 is provided, actionable message processing system 142 can receive actionable messages and process them so that actions can be taken from with the user's e-mail system. As long as the messages are marked up in a way that parsing logic 404 can parse them, actionable messages can be processed. This allows the user to perform actions associated with the received messages, without needing to change context, such as without needing to navigate away from the user's e-mail system, using a browser or otherwise, to a separate user interface display generated by the service. Instead, the actionable messages can be directly acted on from within the user's e-mail system, and the actions will be taken in the desired service, without the user needing to change context in this way.

Figure 8:
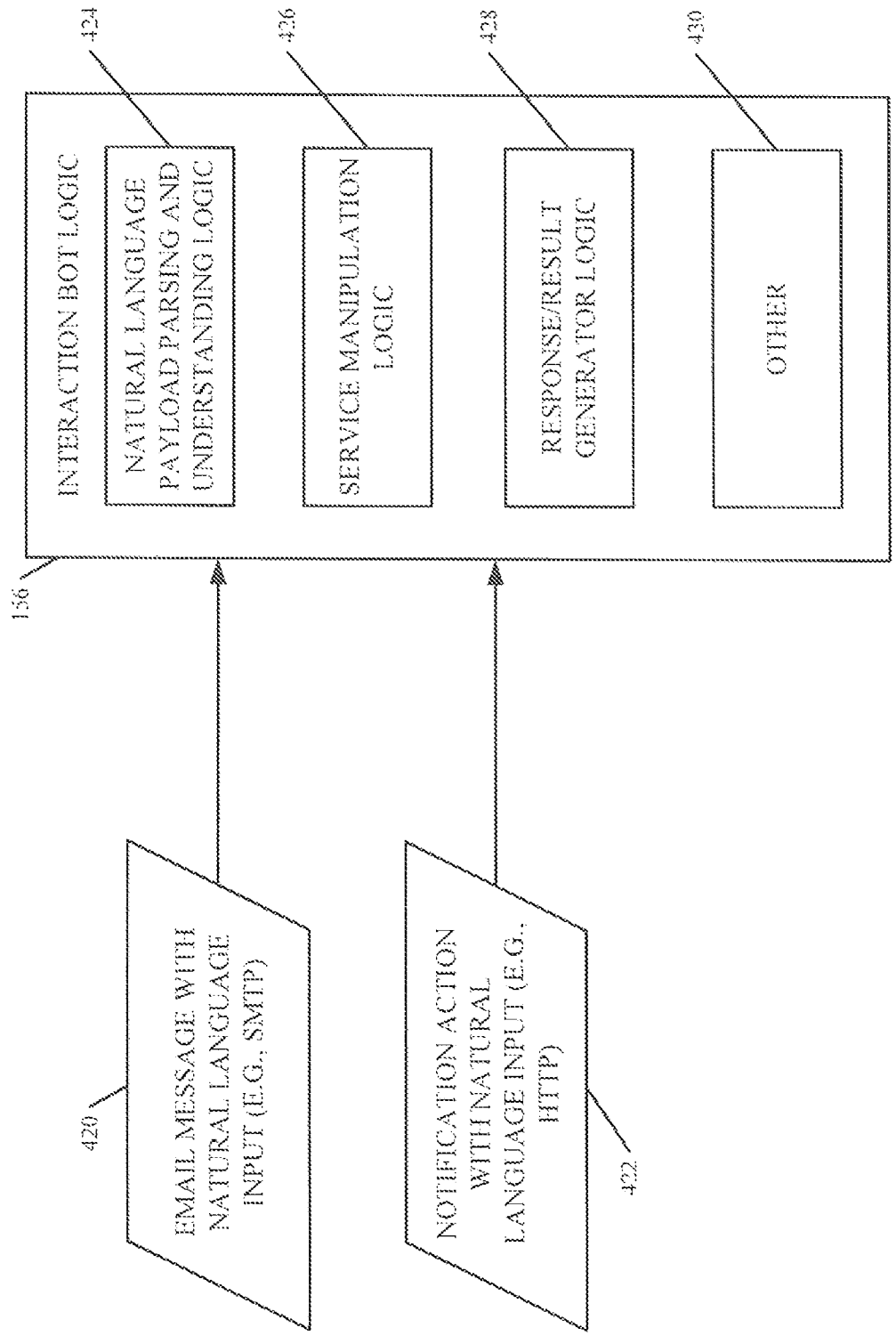
FIG. 8 is a block diagram showing one example of interaction bot logic in more detail.

FIG. 8 is a block diagram showing one example of interaction bot logic 156 in more detail. Again, interaction bot logic 156 can be part of connector support logic 152, or it can be separate. Interaction bot logic 156 allows the user interactions with the service 102 to be more rich and conversational than by simply actuating a user actuatable element on an actionable message. For instance, interaction bot logic 156 illustratively allows the user to provide an e-mail message with a natural language input as indicated by block 420, or a notification action with natural language input (such as by typing into a text box) as indicated by block 422. Both of these types of messages can be received and processed by interaction bot logic 156.

Logic 156 thus includes natural language payload parsing and understanding logic 424, service manipulation logic 426, response/result generator logic 428, and it can include other items 430. It will also be noted that the various items of logic in interaction bot logic 156 can be separate or remote systems that are called from logic 156, or they can be local.

In the present example, natural language payload parsing and understanding logic 424 receives the natural language input from a particular message 420 or 422 and parses that input to generate a semantic or linguistic understanding of that input. This can be done using a rules-based or heuristically-based system, it can be done using a model, it can be done using context-free grammars or other grammars, or the natural language understanding functions can be performed in a wide variety of other ways.

In one example, the meaning of the natural language input is mapped to a particular action that is to be performed within service 102. Service manipulation logic 426 then manipulates the service to perform that action. For instance, one natural language input may simply be to search for a set of free dates within a calendaring service. In another example, the natural language input may indicate an action which assigns a task to a particular individual within a task management service. These are examples only and a wide variety of other actions can be represented by the natural language input as well.

Once service manipulation logic 426 has manipulated the service to perform the desired action, response/result generator logic 428 can generate any desired response or result and provide it back to the particular system that sent the message or notification 420 or 422, respectively. The response or result can thus be surfaced for the user.

Figure 9:
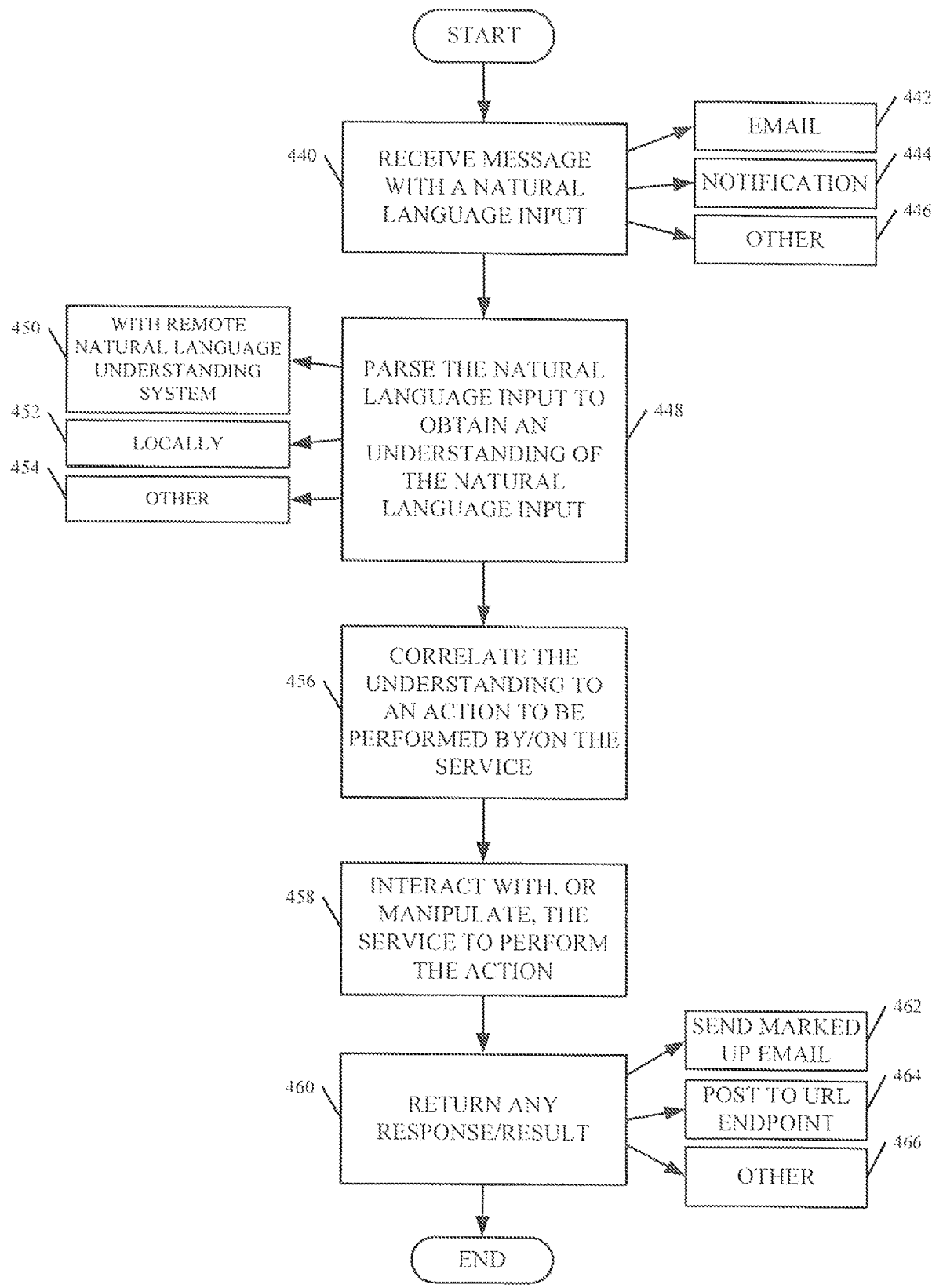
FIG. 9 is a flow diagram illustrating one example of the operation of the interaction bot logic shown in FIG. 8, in processing conversational, natural language inputs.

FIG. 9 is a flow diagram illustrating one example of how a user can provide natural language input in a conversational way, to perform actions within a service using interaction bot logic 156. Parsing and understanding logic 424 first receives a message with a natural language input. This is indicated by block 440 in the flow diagram of FIG. 9. As discussed above, the message can be an e-mail (or SMTP) message 442. It can be a notification (or HTTP posting) 444. The message can be another type of message 446 as well.

Logic 424 then parses the natural language input to obtain an understanding of the natural language input, as indicated by block 448. It can do this by interacting with a remote natural language understanding system, or it can do it locally, as indicated by blocks 450 and 452, respectively. It can do so in other ways 454 as well.

Logic 424 then correlates the understanding to an action to be performed by or on a given service. This is indicated by block 456. Manipulation logic 426 then interacts with, or manipulates, the service to perform the action. This is indicated by block 458.

Response/result generator logic 428 then returns any response or result of the action to the user through the particular system with which the user sent the system. This is indicated by block 460. For example, the result or response can be returned as an e-mail that is to be rendered within the user's inbox. This is indicated by block 462. It can be returned as a post to the URL endpoint corresponding to the user as indicated by block 464. That post can then be rendered as discussed above, as an e-mail message within the user's inbox. The result or response can be sent and processed in other ways as well, and this is indicated by block 466.

Figure 9A:
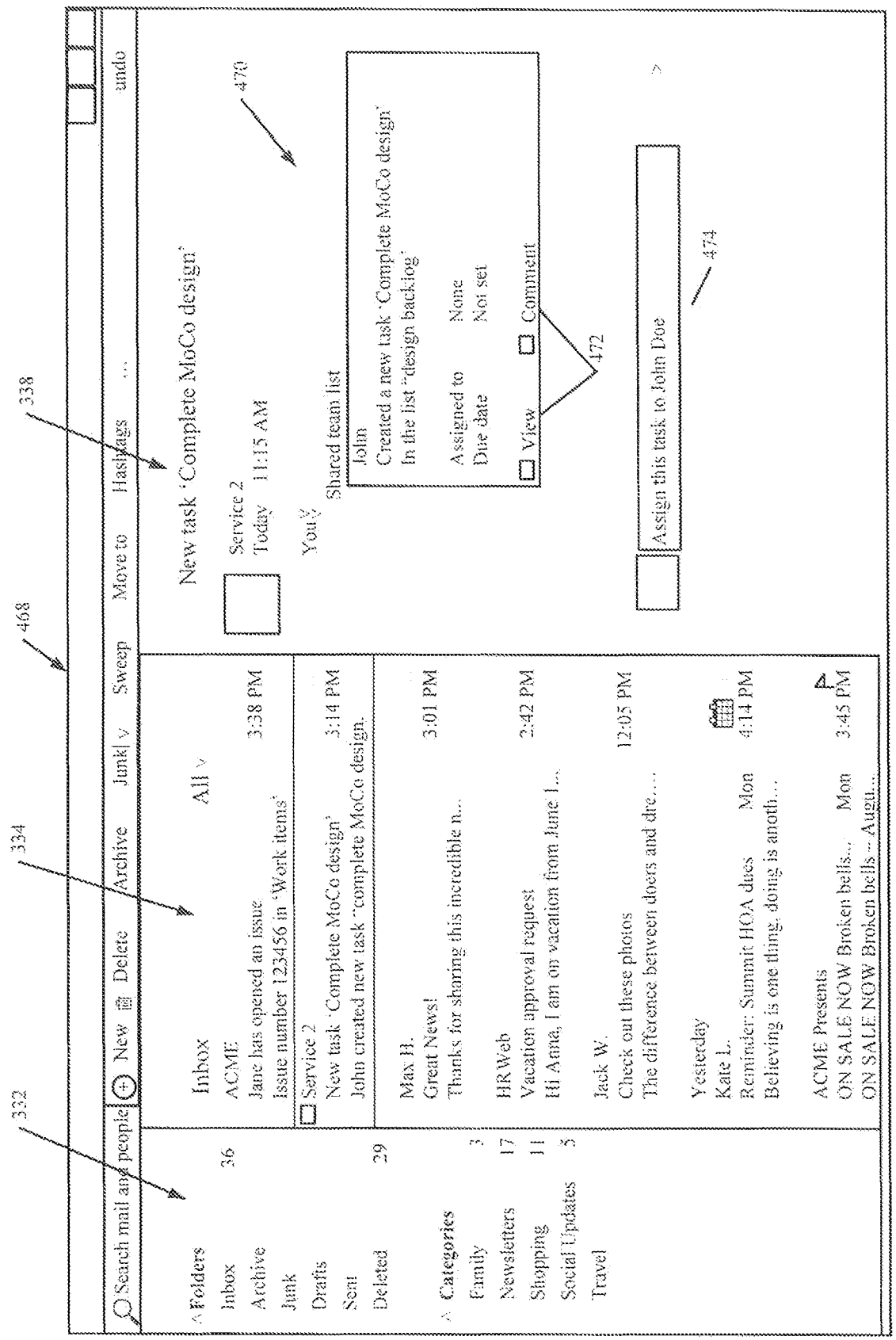

FIGS. 9A-9E show various user interface displays that indicate this. FIG. 9A shows one example of a user interface display 468 that can be generated within a user's inbox. Some of the items shown in FIG. 9A are similar to those shown above in FIG. 6A, and they are similarly numbered. FIG. 9A shows that the user has received a message from Service 2 and has selected that message so that it is displayed in reading pane 338. The message content is shown generally at 470, and includes a set of user actuatable inputs 472. It also includes a text box 474 within which the user can enter natural language or conversational text. It can be seen that the user has entered the text "Assign this task to John Doe".

Figure 9B:
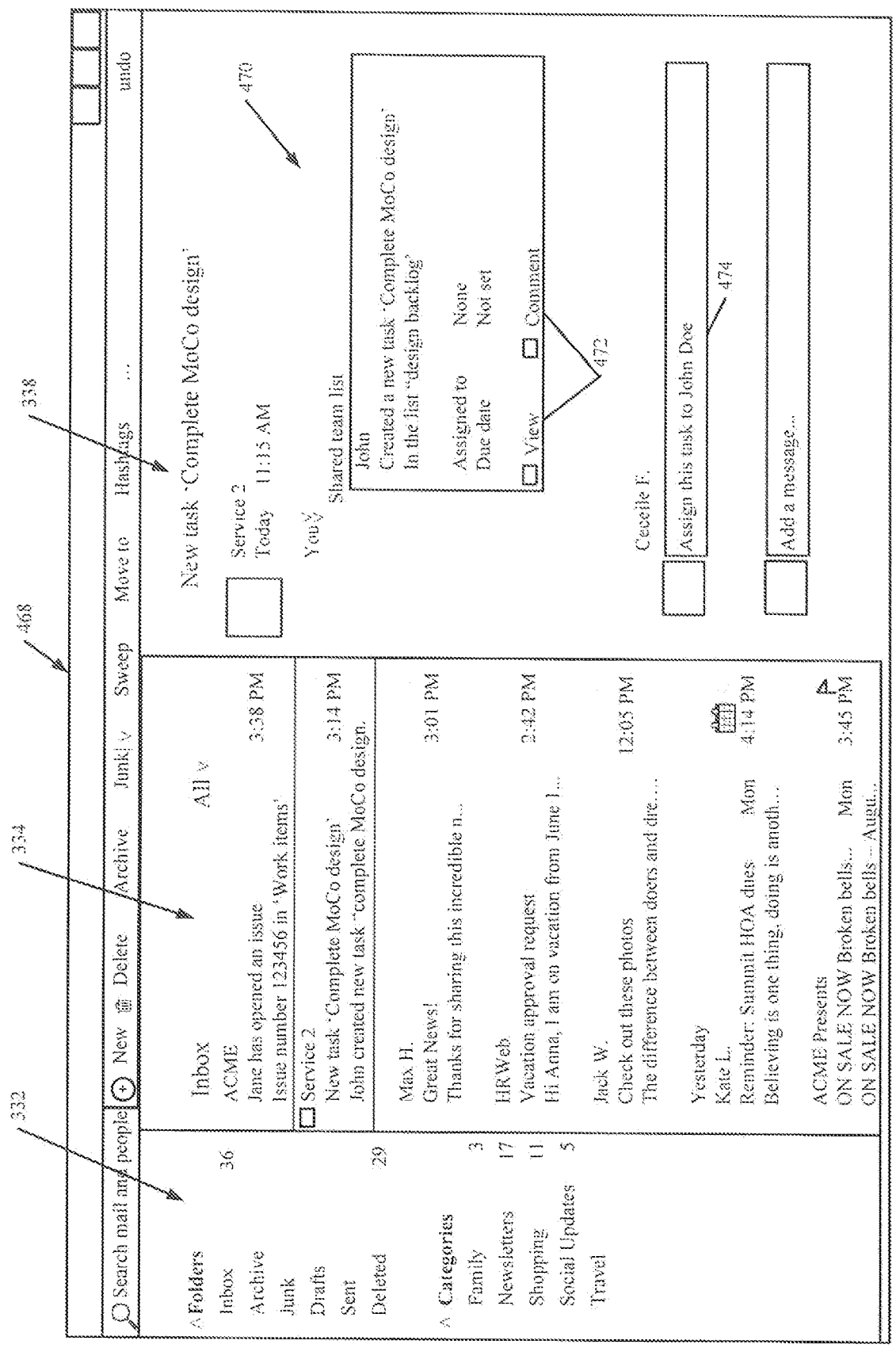

In that case, interactive bot logic 156 can receive the natural language input as a notification action 422 and logic 424 can parse the natural language input to identify this as an assignment task within Service 2. FIG. 9B is similar to FIG. 9A except that it shows that the user has now hit the enter or send button.

Figure 9C:
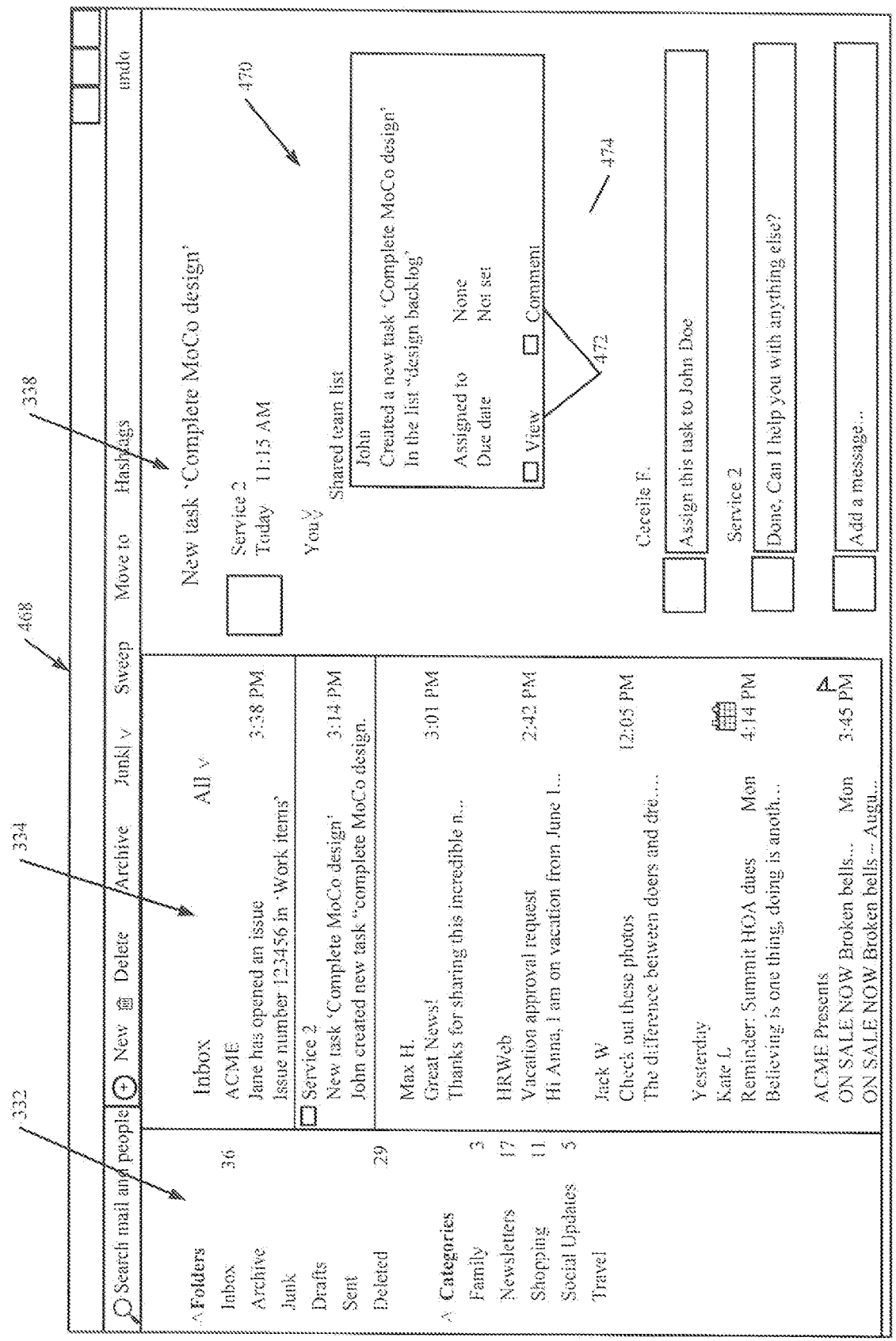

FIG. 9C illustrates that logic 424 has now provided the particular interaction that is to be performed within Service 2 to service manipulation logic 426. Service manipulation logic 426 then interacts with Service 2 (such as by calling a particular API on Service 2 to assign a task) to perform the desired action. It has done so, and the service has provided an indication that the task assignment was completed. Therefore, response/result generator logic 428 generates a response representing the response from Service 2, and showing that the desired task has been complete. This is indicated generally at 476 in FIG. 9C.

Figure 9E:
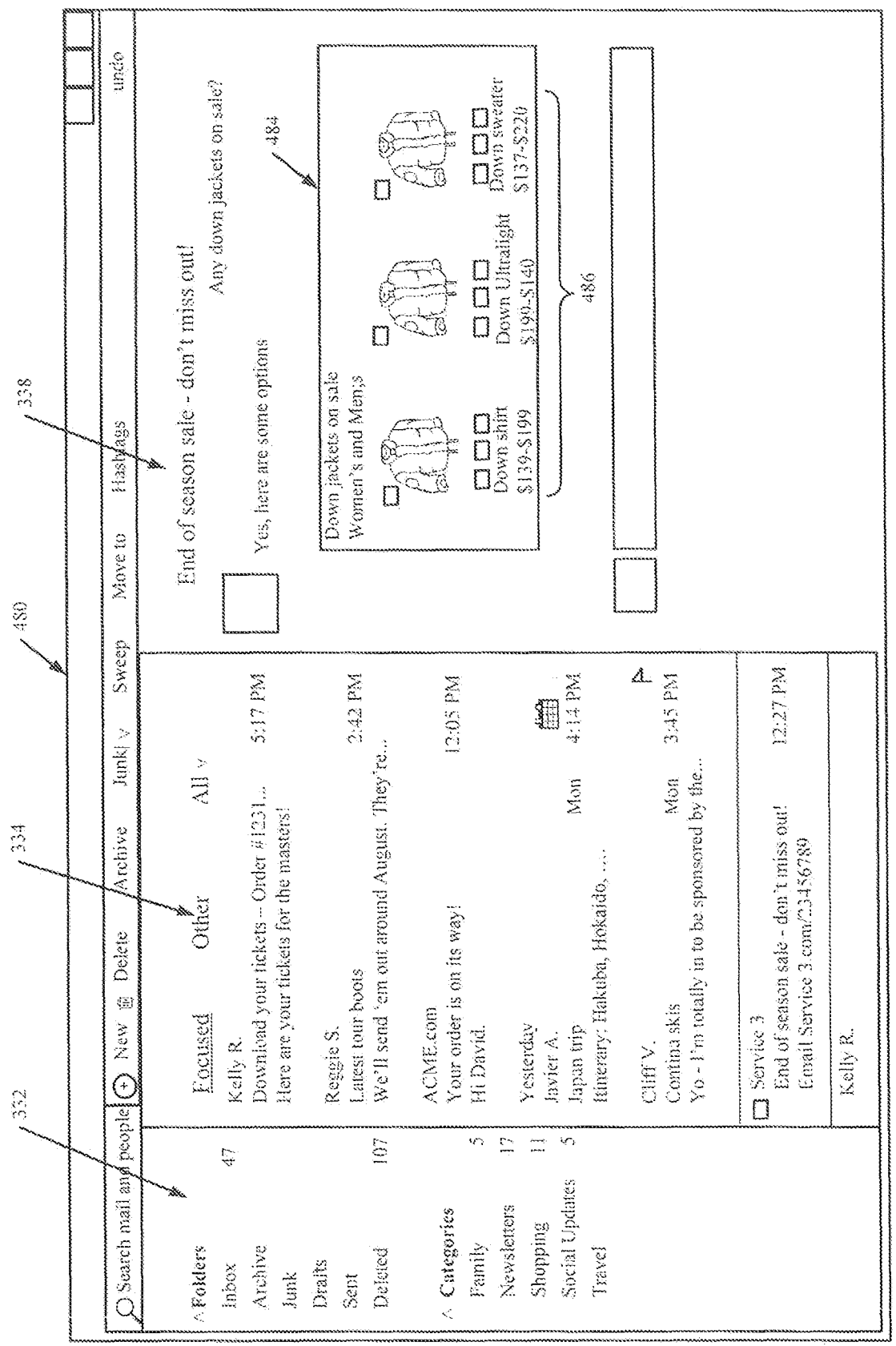

FIGS. 9D and 9E show that the bot interaction logic 156 can be deployed to allow the user to interact with a wide variety of different types of services from within the user's email inbox. For example, in the user interfaces shown in FIGS. 9D and 9E, the interaction bot logic 156 is deployed to interact with a retail or online shopping service. User interface display 480 shown in FIG. 9D is similar to that shown in FIG. 9A, and similar items are similarly numbered. It can be seen that the user has now received a notification or message (that the user has subscribed to) from Service 3, which is a shopping service. The user has selected that message and its content is displayed in reading pane 338. In one example, the message includes a user actuatable text box 482, in which the user can type a natural language input. It can be seen that the user has typed "any down jackets on sale".

FIG. 9E shows that interaction bot logic 156 has received this natural language or conversational input, processed it and identified an action to be performed within the shopping service as a search for down jackets that are on sale. Manipulation logic 426 has performed this search and returned the search results through response/result generator logic 428. FIG. 9E shows that the results 484 include user actuatable elements 486 that the user can actuate in order to view more details for each of the results 484. When the user actuates one of elements 486, then the service can be manipulated again to return a user experience with user actuatable elements that allow the user to actually purchase one of the items. Again, this can all be done from within the user's e-mail inbox, and without the user needing to navigate away from that context (such as using a browser) to any other user interface provided by a service.

This type of system also turns email usage into a synchronous system. For instance, email is normally asynchronous. A sender can send an email and may never receive a response to it. However, when user interaction with a message results in an interaction with an API that, itself, results in an http post, this is a much faster and synchronous communication than email.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The present discussion has also mentioned a cloud computing architecture. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

It will be appreciated that, in various examples of a cloud architecture, it is also contemplated that some elements can be disposed in the cloud while others are not. By way of example, data stores can be disposed outside of the cloud, and accessed through cloud. In another example, various logic or subsystems or components can also outside of the cloud. Regardless of where they are located, they can be accessed directly by a user device, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
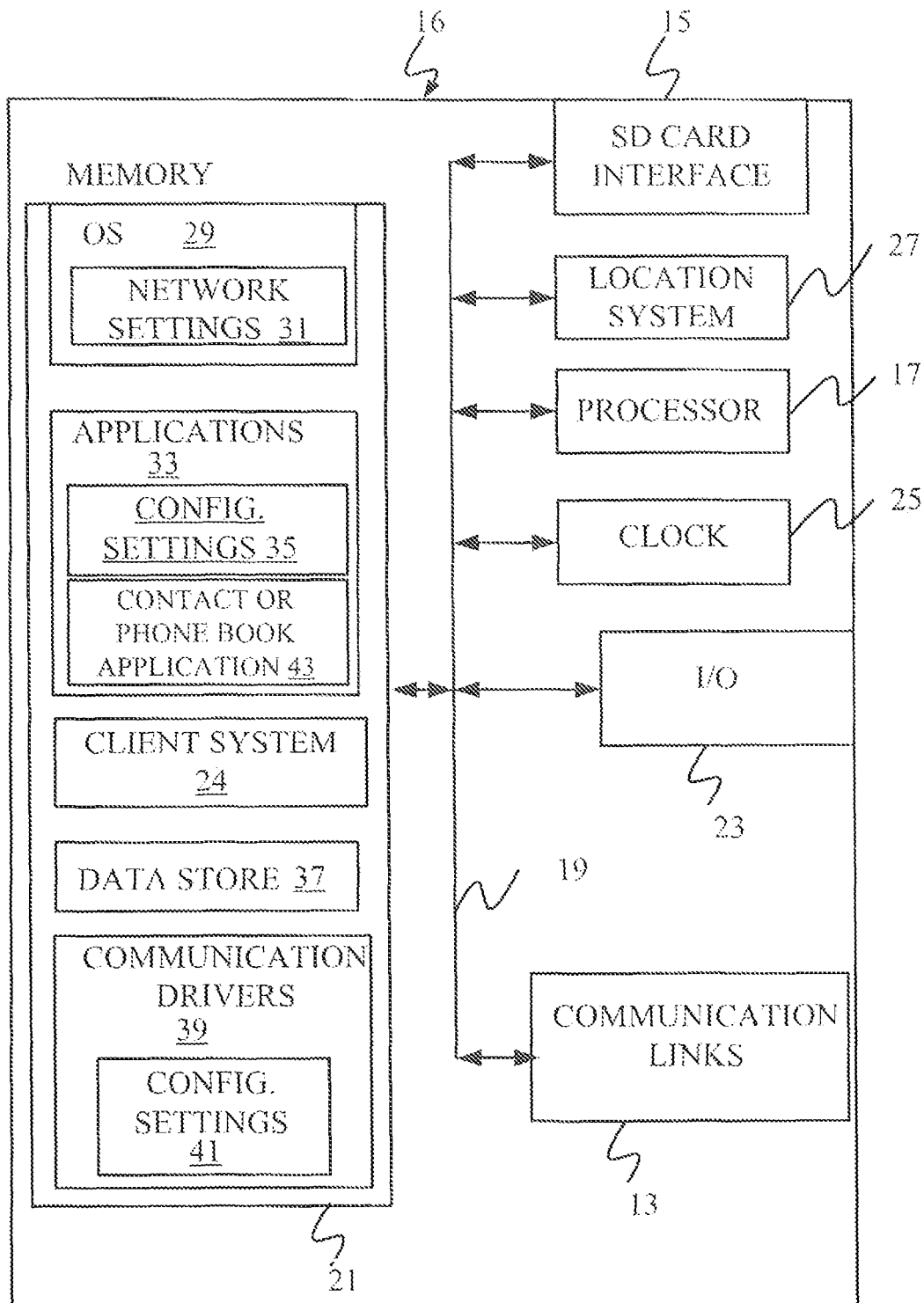
FIGS. 10-12 show examples of mobile devices that can be used in the architectures shown in the previous figures.
Figure 11:
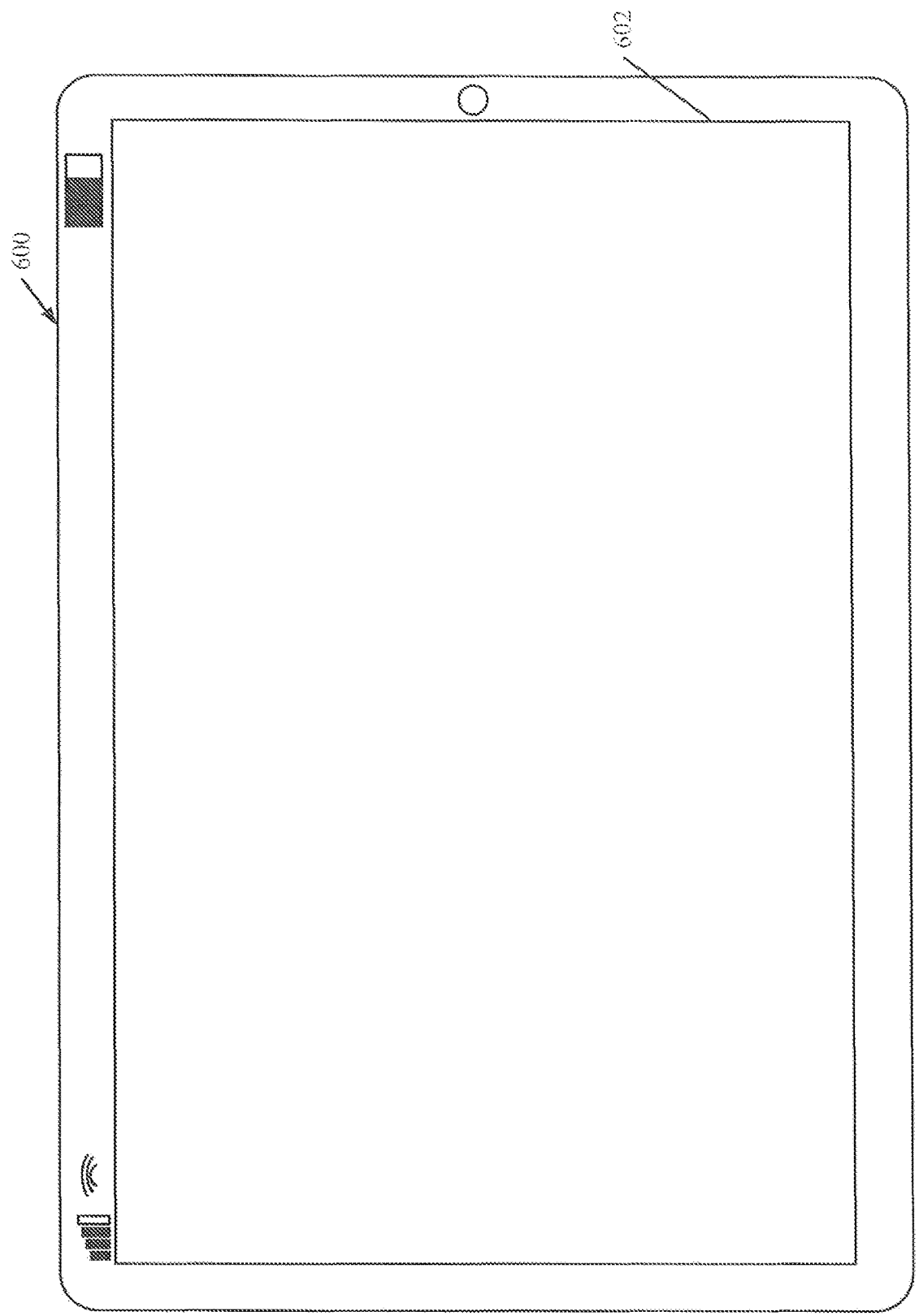
Figure 12:
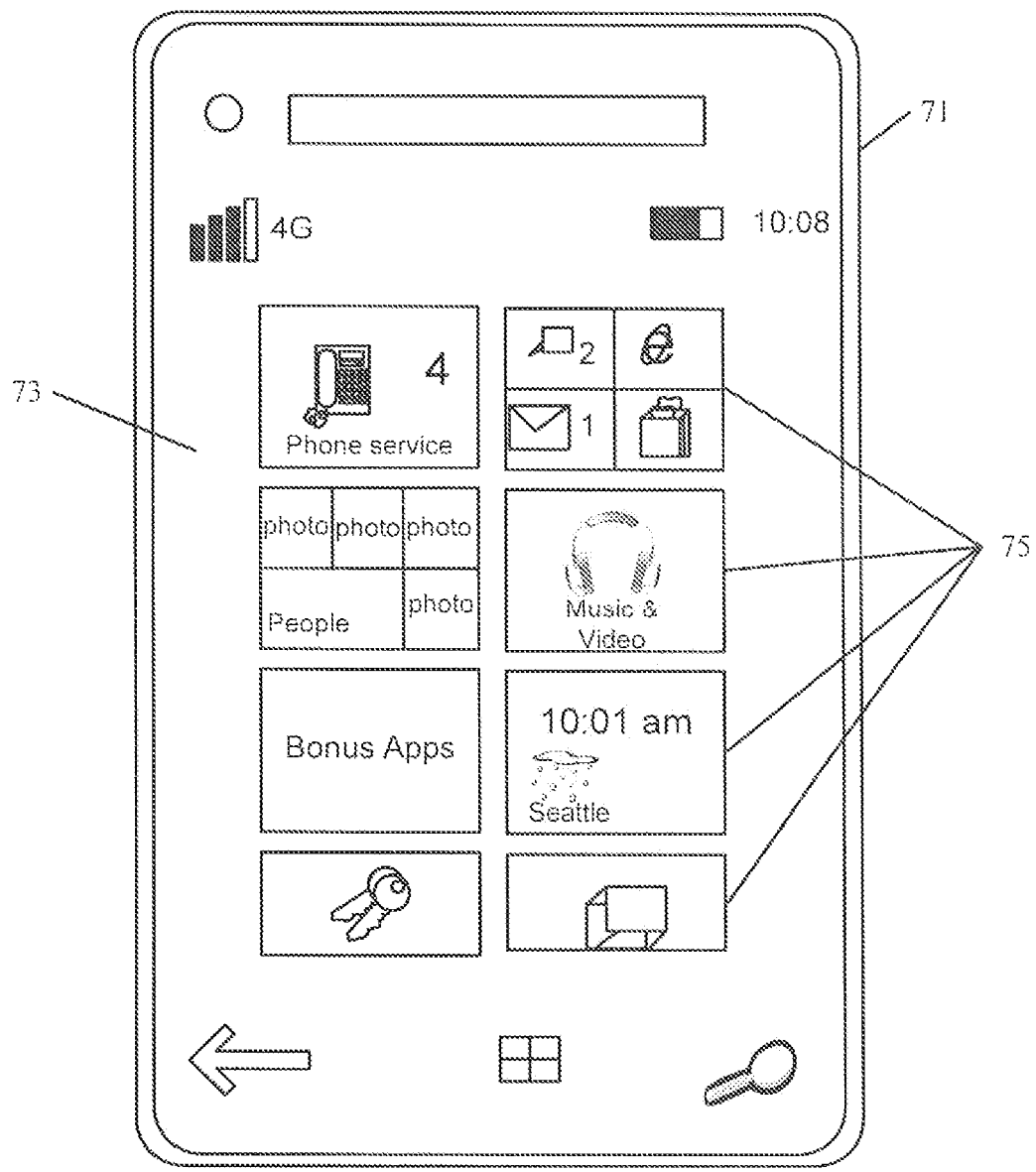

FIG. 10 is a simplified block diagram of one illustrative example of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components of architecture 100, or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one embodiment in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
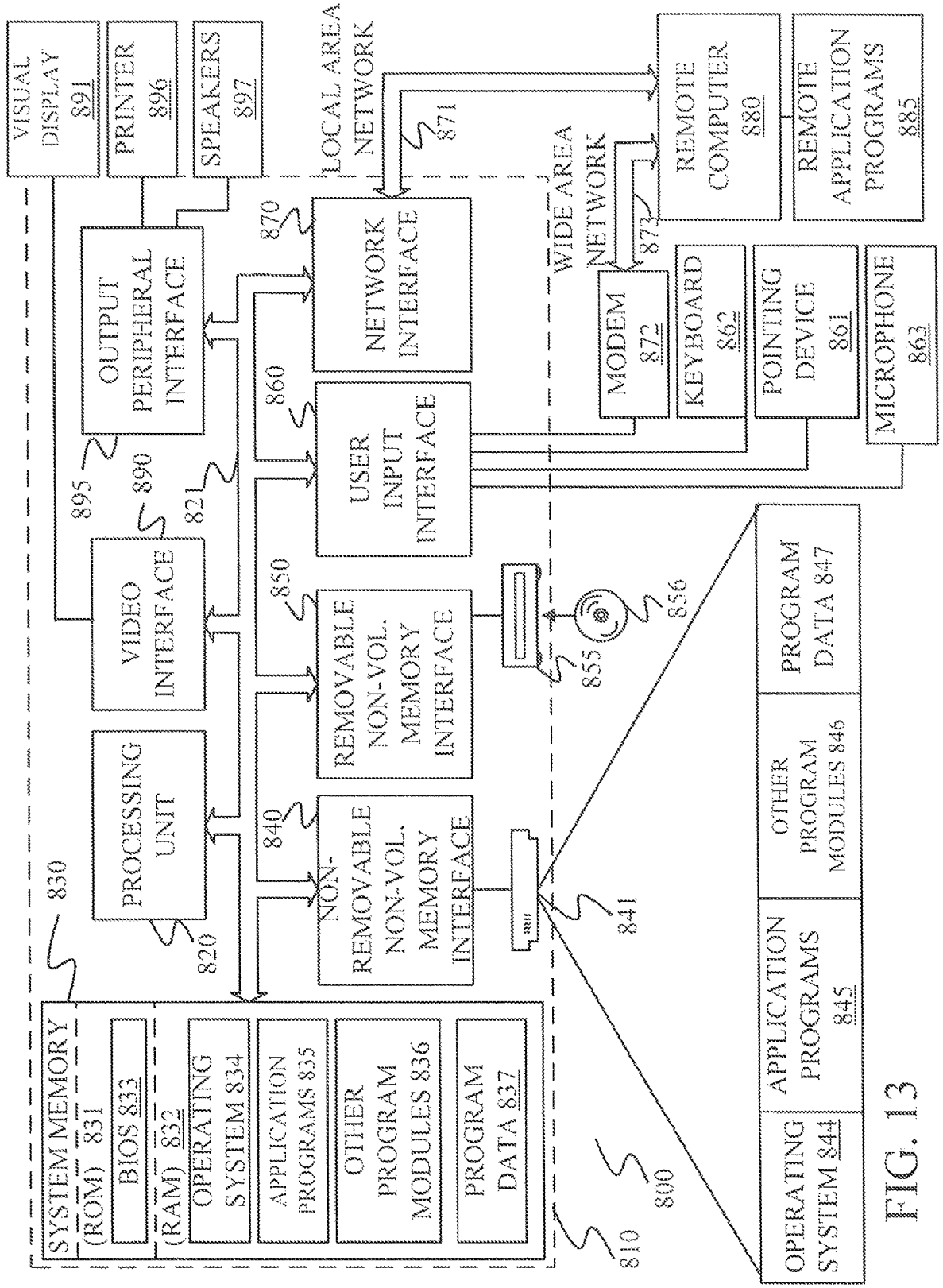
FIG. 13 is a block diagram showing one example of a computing environment that can be used in the architectures shown in the previous figures.

FIG. 13 is one example of a computing environment in which architecture 100, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
electronic mail (email) logic that surfaces email user interfaces for user interaction, to perform email functions in an email system;
an actionable message processing system in the email system that receives an email message identifying a service as a recipient, the email message having a natural language portion corresponding to an action in the identified service, the actionable message processing system parsing the email message to identify a service endpoint to be interacted with, at the identified service; and
service interaction logic that interacts with the service to perform the action based on the natural language portion of the email message.

Example 2 is the computing system of any or all previous examples wherein the service interaction logic comprises:
endpoint interaction logic that receives a response to the action, from the service, and generates a response email message indicative of the response from the service.

Example 3 is the computing system of any or all previous examples and further comprising:
rendering logic that renders the response email message in an inbox of the email system.

Example 4 is the computing system of any or all previous examples wherein the endpoint interaction logic interacts with an endpoint corresponding to the service, providing the endpoint with the natural language portion of the email message that identifies the service as a recipient.

Example 5 is the computing system of any or all previous examples and further comprising:
markup parsing logic configured to receive an actionable message from the service as a marked up message, marked up according to a predefined schema, and parse the marked up message to identify a natural language input mechanism in the actionable message, the rendering logic being configured to render the actionable message in the inbox with the natural language input mechanism.

Example 6 is the computing system of any or all previous examples and further comprising:
message interaction detector logic configured to detect user entry of the natural language portion of the message using the natural language input mechanism on the rendered message, the actionable message processing system receiving, as the email message identifying the service, a reply message generated in response to the user entering the natural language portion using the natural language input mechanism.

Example 7 is the computing system of any or all previous examples wherein the service interaction logic comprises:
natural language understanding logic configured to identify an action to perform in the service based on the natural language portion of the email message.

Example 8 is the computing system of any or all previous examples wherein the service interaction logic further comprises:
service manipulation logic that interacts with the service to perform the action in the service.

Example 9 is the computing system of any or all previous examples and further comprising:

response generator logic that generates the response from the service.

Example 10 is a computer-implemented method, comprising:

receiving authoring inputs to author an email message in an email system identifying a service as a recipient, the email message having a natural language portion corresponding to an action in the identified service;

parsing the email message to identify a service endpoint to be interacted with, at the identified service; and interacting with the service to perform the action based on the natural language portion of the email message.

Example 11 is the computer-implemented method of any or all previous examples wherein interacting with the service comprises:

receiving a response to the action, from the service; and generating a response email message indicative of the response from the service.

Example 12 is the computer-implemented method of any or all previous examples and further comprising:

rendering the response email message in an inbox of the email system.

Example 13 is the computer-implemented method of any or all previous examples wherein interacting with the service comprises:

interacting with an endpoint corresponding to the service by providing the endpoint with the natural language portion of the email message that identifies the service as a recipient.

Example 14 is the computer-implemented method of any or all previous examples and further comprising:

receiving an actionable message from the service as a marked up message, marked up according to a predefined schema; and parsing the marked up message to identify a natural language input mechanism in the actionable message, wherein rendering comprises rendering the actionable message in the inbox along with the natural language input mechanism.

Example 15 is the computer-implemented method of any or all previous examples and further comprising:

detecting user entry of the natural language portion of the message using the natural language input mechanism on the rendered message; and receiving, as the email message identifying the service, a reply message generated in response to the user entering the natural language portion using the natural language input mechanism.

Example 16 is the computer-implemented method of any or all previous examples wherein interacting with the service comprises:

identifying an action to perform in the service based on the natural language portion of the email message.

Example 17 is the computer-implemented method of any or all previous examples wherein interacting with the service comprises:

interacting with the service to perform the action in the service.

Example 18 is the computer-implemented method of any or all previous examples and further comprising:

generating a result of performing the action in the service; and generating the response as being indicative of the result.

Example 19 is a computer system, comprising:

electronic mail (email) logic that surfaces email user interfaces for user interaction, to perform email functions in an email system;

an actionable message processing system in the email system that receives an email message identifying a service as a recipient, the email message having a natural language portion corresponding to an action in the identified service, the actionable message processing system parsing the email message to identify a service endpoint to be interacted with, at the identified service;

service interaction logic that interacts with a bot at the service to perform the action based on the natural language portion of the email message;

endpoint interaction logic that receives a response to the action, from the bot in the service, and generates a response email message indicative of the response; and rendering logic that renders the response email message in an inbox of the email system.

Example 20 is the computing system of any or all previous examples and further comprising:

markup parsing logic configured to receive an actionable message from the service as a marked up message, marked up according to a predefined schema, and parse the marked up message to identify a natural language input mechanism in the actionable message, the rendering logic being configured to render the actionable message in the inbox with the natural language input mechanism; and message interaction detector logic configured to detect user entry of the natural language portion of the message using the natural language input mechanism on the rendered message, the actionable message processing system receiving, as the email message identifying the service, a reply message generated in response to the user entering the natural language portion using the natural language input mechanism.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A server computing system, comprising:
   at least one processor; and
   memory storing instructions executable by the at least one processor, wherein the instructions, when executed, configure the server computing system to:
      transmit a marked up notification, corresponding to a service, to a client device using a data transfer protocol, wherein the marked up notification is marked up according to a predefined schema and represents rendering information configured to render a text box on the client device, the text box configured to receive a natural language user input;
      receive, from the client device, an email message that
         identifies the service as a recipient, and
         has a natural language portion that includes the natural language user input provided by a user through the text box;
      using a natural language processor to generate at least one of a semantic or linguistic understanding of the natural language portion, wherein the semantic or linguistic understanding is mapped to an action to perform in the service; and
      interact with a service endpoint associated with the service to perform the action.

2. The server computing system of claim 1, wherein the instructions configure the server computing system to:
receive, from the service, a response to the action; and
communicate the response to the client device.

3. The server computing system of claim 2, wherein the instructions configure the server computing system to:
interact with the service endpoint corresponding to the service by providing the service endpoint with the natural language portion of the email message that identifies the service as the recipient.

4. The server computing system of claim 3, wherein the email message comprises a reply to the marked up notification.

5. The server computing system of claim 1, wherein the email message comprises a reply message generated in response to the user entering the natural language user input.

6. The server computing system of claim 1, wherein the data transfer protocol comprises hypertext transfer protocol (http) and the marked up notification comprises an http post to a uniform resource locator (URL) endpoint corresponding to the client device.

7. The server computing system of claim 6, wherein the email message is received using simple mail transfer protocol (SMTP).

8. A computer-implemented method, comprising:
receiving a marked up notification transmitted by a service using a data transfer protocol,
wherein the marked up notification is marked up according to a predefined schema;
parsing the marked up notification to identify:
a natural language input mechanism, configured to receive a natural language user input, in the marked up notification and identify rendering information associated with rendering the natural language input mechanism, and
threading information indicative of a relationship between the marked up notification and another marked up notification;
determining that the marked up notification is part of a conversation thread based on the threading information in the marked up notification;
generating a notification email message including the natural language input mechanism;
rendering the notification email message with the natural language input mechanism, using the rendering information, in an email inbox as part of the conversation thread;
generating an email message that
identifies the service as a recipient, and
has a natural language portion that includes a natural language user input provided by a user through the natural language input mechanism, the natural language portion representing an action to perform in the service; and
sending the email message to a service endpoint at the service.

9. The computer-implemented method of claim 8 further comprising:
receiving a response to the action, from the service;
generating a response email message indicative of the response from the service; and
rendering the response email message in the email inbox associated with the user.

10. The computer-implemented method of claim 9 and further comprising:
receiving the marked up notification from the service as a hypertext transfer protocol (http) post to a unique uniform resource locator (URL) endpoint corresponding to a computing system, wherein the marked up notification identifies an interface, associated with the service, to be called to perform the action.

11. The computer-implemented method of claim 8 wherein sending the email message to the service comprises:
interacting with the service endpoint corresponding to the service by providing the service endpoint with the natural language user input of the email message that identifies the service as a recipient.

12. The computer-implemented method of claim 11 wherein the email message comprises a reply to the notification email message.

13. The computer-implemented method of claim 9 and further comprising:
detecting user entry of the natural language user input using the natural language input mechanism; and
generating, as the email message identifying the service, a reply message generated in response to the user entering the natural language user input using the natural language input mechanism.

14. The computer-implemented method of claim 11 wherein interacting with the service comprises:
interacting with the service endpoint to perform the action in the service.

15. The computer-implemented method of claim 9, and further comprising:
generating an email user interface display including a text box; and
receiving the natural language user input through the text box.

16. A server computing system, comprising:
at least one processor; and
memory storing instructions executable by the at least one processor, wherein the instructions, when executed, configure the server computing system to:
transmit a marked up notification, from a service, to a client device using a data transfer protocol,
wherein the marked up notification is marked up according to an object notation that uses attribute-value pairs and represents rendering information configured to render a text box on the client device, the text box configured to receive a natural language user input;
receive, from the client device, an email message that identifies the service as a recipient, and
has a natural language portion that represents the natural language user input provided through the text box;
use a natural language processor to generate at least one of a semantic or linguistic understanding of the natural language portion, wherein the at least one of a semantic or linguistic understanding is mapped to an action to perform in the service; and
send a response to the action, performed in the service, to the client device.

17. The server computing system of claim 16 wherein the data transfer protocol comprises hypertext transfer protocol (http) and the marked up notification comprises an http post to a uniform resource locator (URL) endpoint corresponding to the client device.

18. The server computing system of claim 17, wherein the email message is received using an email transfer protocol that is different than the data transfer protocol.

19. The server computing system of claim 18, wherein the email transfer protocol comprises simple mail transfer protocol (SMTP).

\* \* \* \* \*